United States Patent [19]
Ise et al.

[11] Patent Number: 5,140,647
[45] Date of Patent: Aug. 18, 1992

[54] IMAGE JOINING METHOD AND SYSTEM

[75] Inventors: Hirotoshi Ise, Yokohama, Japan; Haruo Takeda, Palo Alta, Calif.

[73] Assignee: Hitachi, Ltd., Tokyo, Japan

[21] Appl. No.: 623,503

[22] Filed: Dec. 7, 1990

[30] Foreign Application Priority Data

Dec. 18, 1989 [JP] Japan ................ 1-326111

[51] Int. Cl.$^5$ ............................................. G06K 9/36
[52] U.S. Cl. ................................... 382/41; 250/578.1; 382/62; 382/65
[58] Field of Search .............. 382/41, 67, 62, 65, 382/46; 358/183, 22; 250/548, 557, 208.1, 578.1

[56] References Cited

U.S. PATENT DOCUMENTS

| | | | |
|---|---|---|---|
| 3,962,681 | 6/1976 | Requa et al. | 382/67 |
| 3,976,982 | 8/1976 | Eiselen | 382/46 |
| 4,272,756 | 6/1981 | Kakumoto et al. | 382/67 |
| 4,356,513 | 10/1982 | Yoshimura et al. | 382/67 |
| 4,465,939 | 8/1984 | Tamura | 382/67 |
| 4,776,031 | 10/1988 | Mita | 382/67 |

Primary Examiner—Joseph Mancuso
Attorney, Agent, or Firm—Antonelli, Terry Stout & Kraus

[57] ABSTRACT

An image of a size exceeding a reading surface area of an image input temperature is divided into a plurality of image portions such that the image portions resulting from the division have respective overlap regions. A position detectable mark is attached to each of the overlap regions. The plurality of image portions are joined together into one image by making use of the marks.

12 Claims, 20 Drawing Sheets

FIG. 9
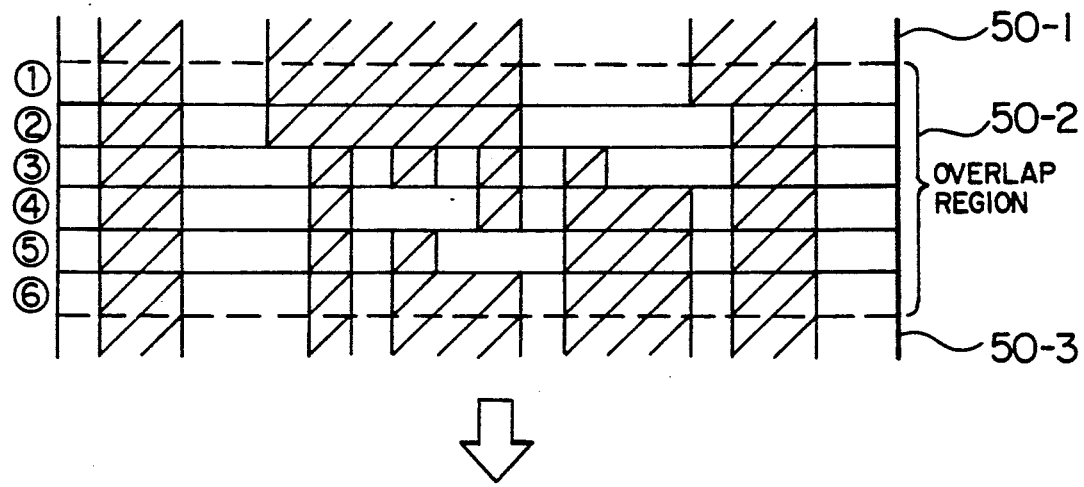
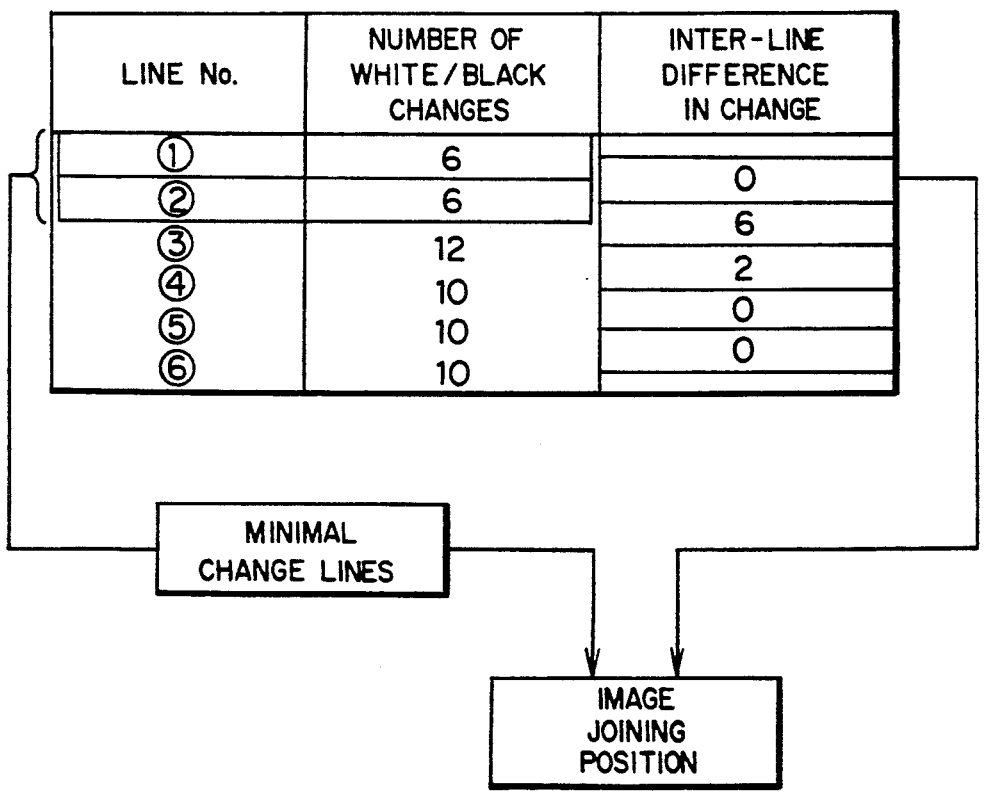

IMAGE JOINING METHOD AND SYSTEM

BACKGROUND OF THE INVENTION

The present invention relates generally to image joining method and apparatus. More particularly, the invention is concerned with an image joining scheme suited profitably for inputting a picture or image of a large size such as a newspaper size, A2 size, A3 size or the like by using a small type image input device such as a scanner for A4 size or the like.

In recent years, a document image file system (electronic file) in which an optical disc of a large capacity is employed attracts public attention as novel document managing means. The range of application of such document image file system tends to be increasingly widen, and there arises a demand for the capability of filing pictures or images of large size such as that of a newspaper, an architectural drawing or the like, as they are. For meeting the demand, there has been developed a large size image input or reading device such as an A1-scanner, as exemplified by "A1 Scanner (HT-4634-11)" for a file "HITFILE 650" commercially available from Hitachi Co. of Japan.

SUMMARY OF THE INVENTION

The hitherto known large size image input or reading apparatus mentioned above suffers from problems in that it involves high manufacturing cost and requires large space for installation because of large input or reading surface area on the order of A1 size.

Accordingly, an object of the present invention is to provide an image joining system which allows a picture or image of a large size such as A1 size to be inputted and stored by using an image input (reading) apparatus of a relatively small size such as for A4 size or smaller which can be manufactured at lower cost.

In the course of studying and developing a means which allows a large size image to be inputted or read by an image input apparatus of a relatively small size, the inventors of the present application got idea of dividing a large size image to be inputted into a plurality of image portions, which are then sequentially inputted, whereon the inputted image divisions or portions are joined together to thereby restore the original large size image. In that case, the original image of large size should be restored without any appreciable distortions and with high accuracy.

It is therefore another object of the present invention to provide an image joining system which is capable of restoring an original image of large size with high accuracy after it has been inputted through division.

In view of the above and other objects which will be more apparent as description proceeds, there is provided according to an aspect of the present invention an image joining system in which an image to be inputted (original image) of a greater size than that of input surface area of an image input device such as a scanner or the like is divided into a plurality of image portions which are then sequentially inputted through the above-mentioned image input device, whereon the input image portions (divided images) are joined together to one image on image storing means (memory) by matching the positions of the individual image portions by making use of detectable graphic patterns such as marks each indicating a reference point for the joining.

For realizing the position matching of the individual image portions with the aid of the marks, seals each printed with a detectable mark indicating a reference point for the image joining may be attached to an overlap region of each of the individual image portions to be joined together or the image to be inputted is placed on a carrier (such as carrier sheet, pass case or the like) printed with similar marks, whereon the image of concern is inputted by dividing it in such a manner in which the regions covering the mark positions overlap each other.

For matching the positions of two image portions inputted by dividing an image to be inputted there may be adopted a mark center position detecting method based on a structural analysis, a least pixel change line detecting method, a greatest white line detecting method, a logical sum (ORing) joining method, a white tracing method, a geometrical transformation method and others.

According to the teachings of the present invention, an original image (i.e. image to be inputted) can be inputted by using an image input device having an input surface area smaller than the size of the original image by virtue of such arrangement that the original image is divided into a plurality of image portions which are then sequentially inputted, whereon the inputted image portions are joined together on the image memory. Thus, it is possible to input for storage a picture or image data of greater size with an inexpensive image input apparatus equipped with an image input (reading) device having a smaller input or reading surface area.

Further, because the individual input image portions can be matched in the position with high accuracy upon joining by making use of the marks, the original image can be restored with high fidelity without distortions to be subsequently stored in the image memory.

Besides, by adopting the geometrical transformation method and others which will be described in detail later on, the image portions can be joined together continuously and smoothly so that joint between the image portions makes no appearance at any point of the boundary. Thus, the image resulting from the joining processing can enjoy high image quality without presenting any appreciable discontinuity when the image is visually observed.

BRIEF DESCRIPTION OF THE DRAWINGS

FIG. 9 is a view for illustrating a least pixel change line detecting method;

DESCRIPTION OF THE PREFERRED EMBODIMENTS

Now, the present invention will be described in detail in conjunction with exemplary or preferred embodiments thereof by reference to the accompanying drawings.

Figure 1:
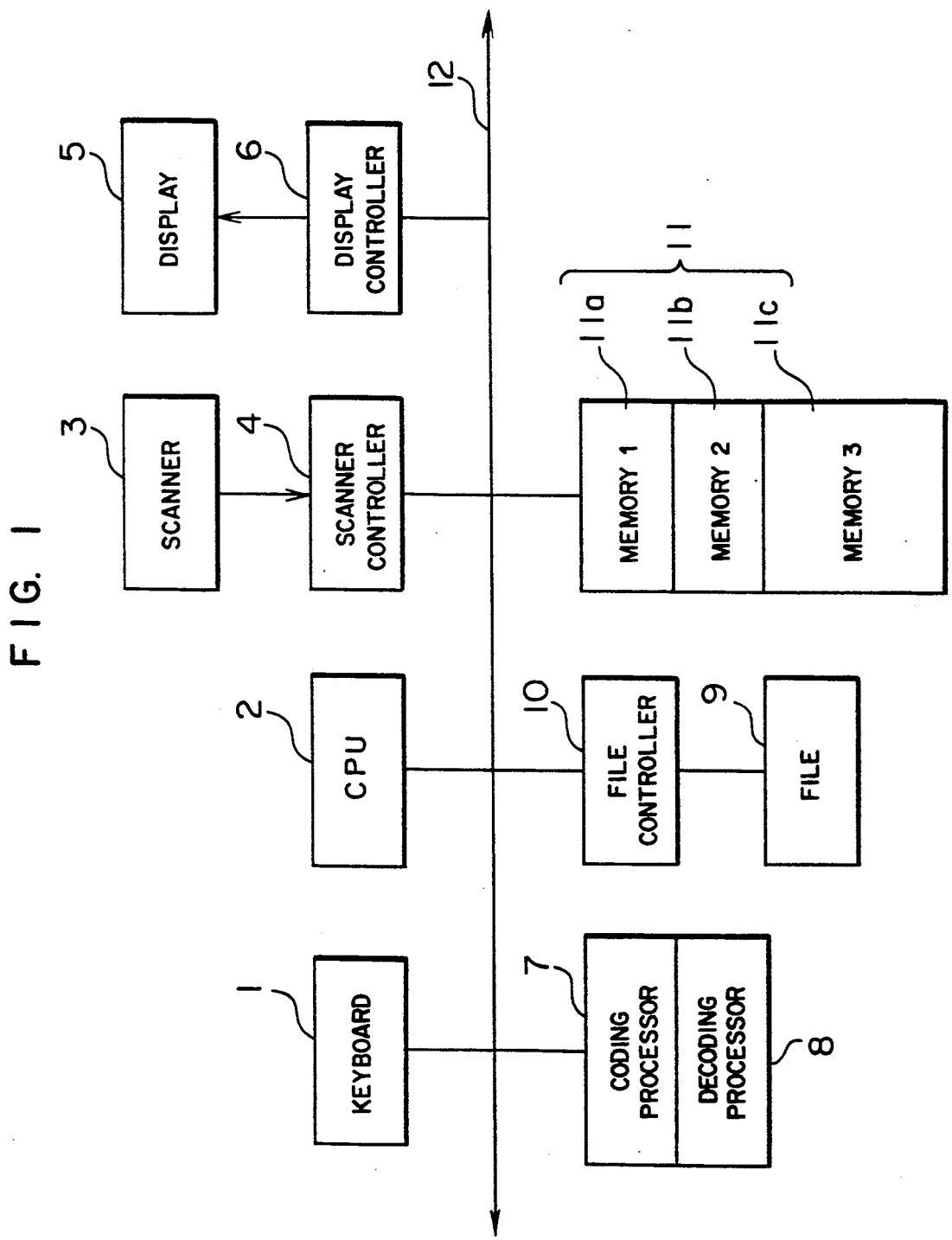
FIG. 1 shows a general arrangement of a system for carrying out the present invention.

FIG. 1 shows, by way of example, a general arrangement of a system for carrying out the present invention. In the figure, a reference numeral 1 denotes a keyboard for inputting code data representing the coordinates of positions of images or pictures, joining regions thereof and others. A numeral 2 denotes a CPU (Central Processing Unit) which serves for controlling the whole system as well as for expansion processing of black pixels (picture elements) and detection of the joining position and other processing for images stored in a memory. A numeral 3 denotes a scanner for inputting images or pictures to be processed (which scanner may also be referred to as image input means). A numeral 4 denotes a scanner controller for controlling the scanner 3. A numeral 5 denotes a display for conforming the code data inputted through the keyboard 1. A numeral 6 denotes a display controller for controlling the display 5. A numeral 7 denotes coding processor for encoding the image inputted through the scanner 3. A numeral 8 denotes a decoding (restoration) processor for decoding the coded data of the input image for restoration thereof. A numeral 9 denotes a file for storing therein the image data undergone the join processing. A numeral 10 denotes a file controller for controlling the input/output operation of the image data to/from the file 9. Finally, a reference numeral 11 denotes a memory (image storing means) for storing therein the image data inputted through the scanner 3 as well as tho image data to be processed and the results of the processing.

Figure 2:
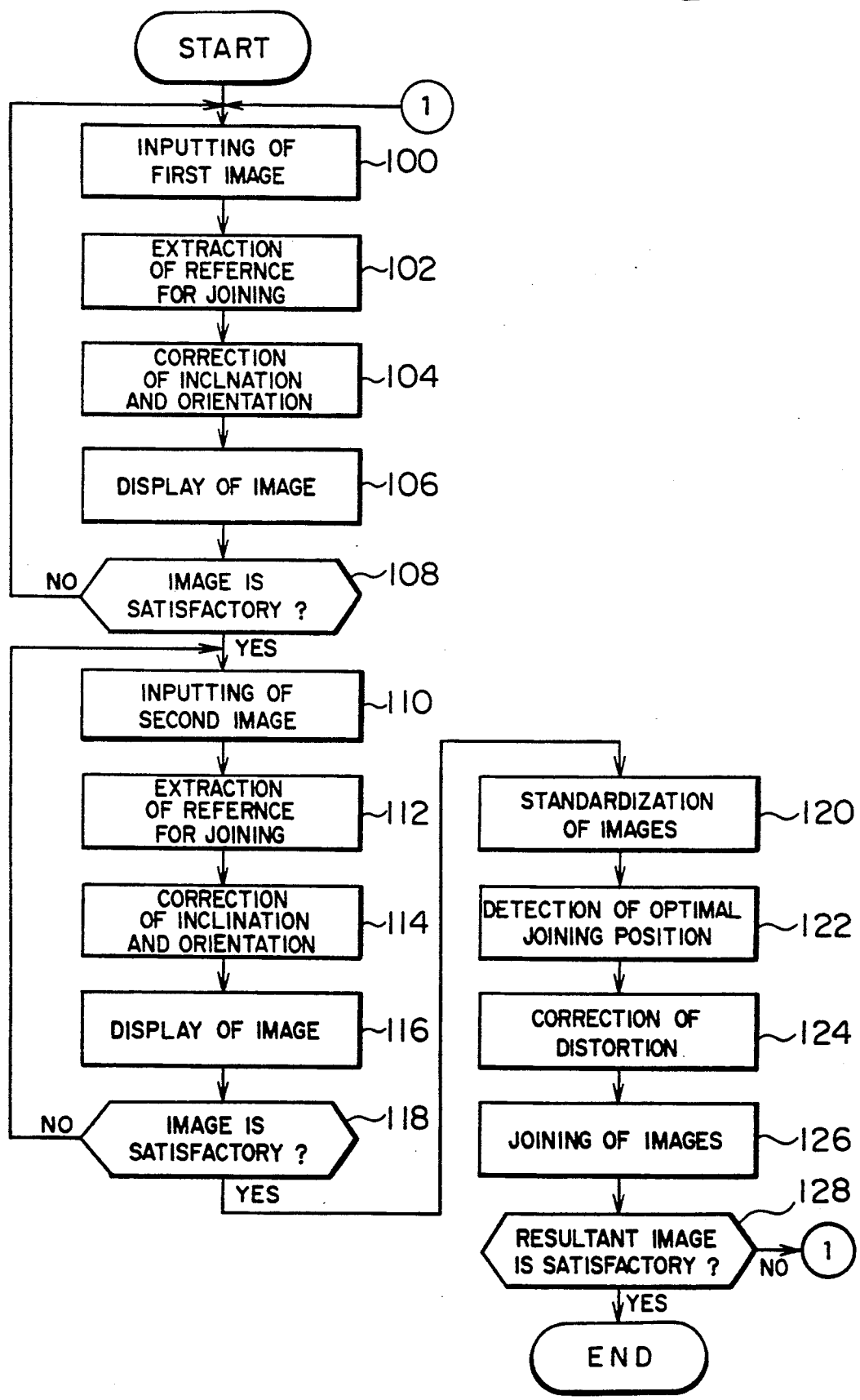
FIG. 2 is a flow chart for illustrating processing procedure according to an embodiment of the present invention.
Figure 3:
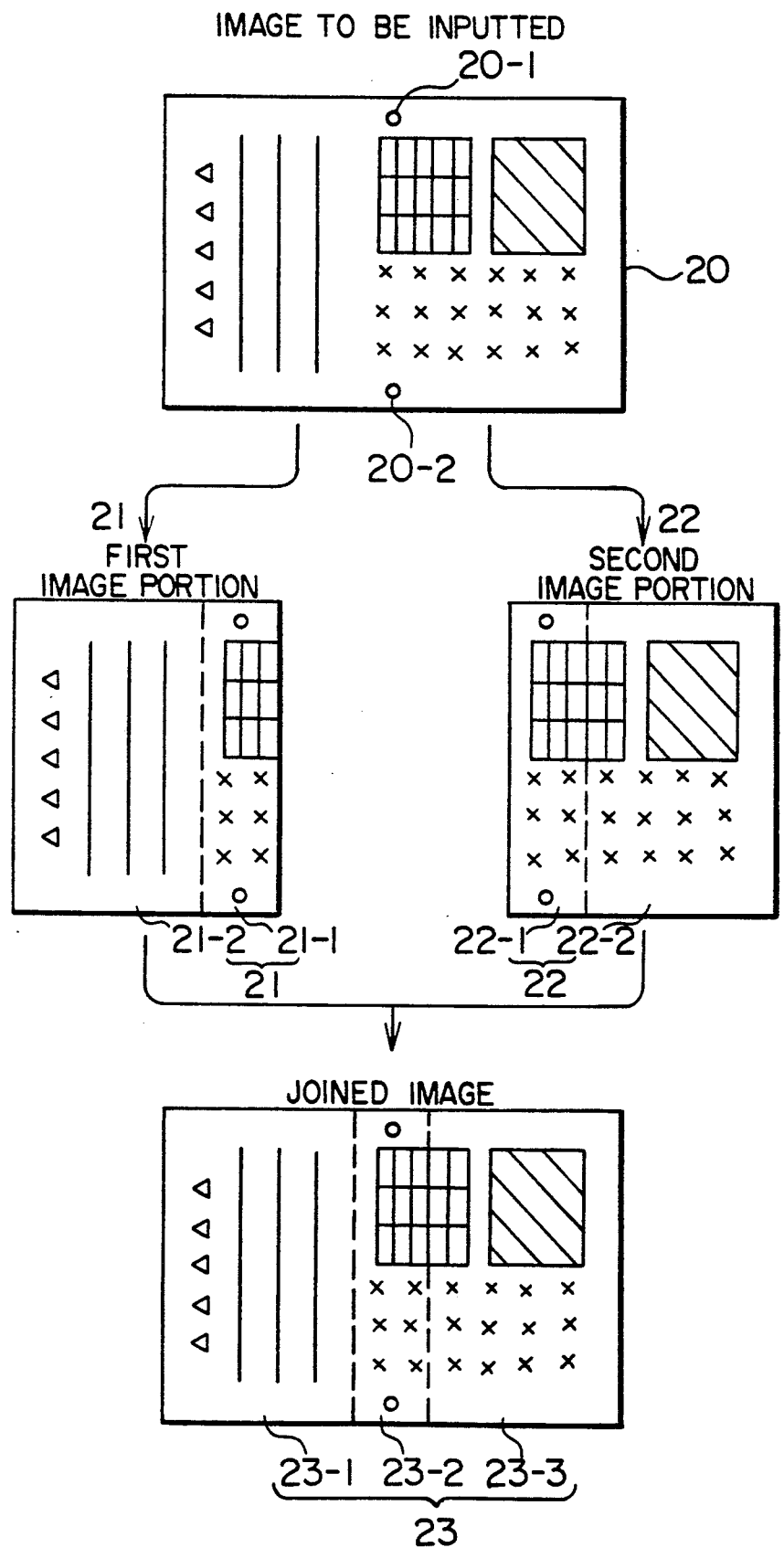
FIG. 3 is a view for illustrating a scheme for dividing an image to be inputted into two image portions.
Figure 15:
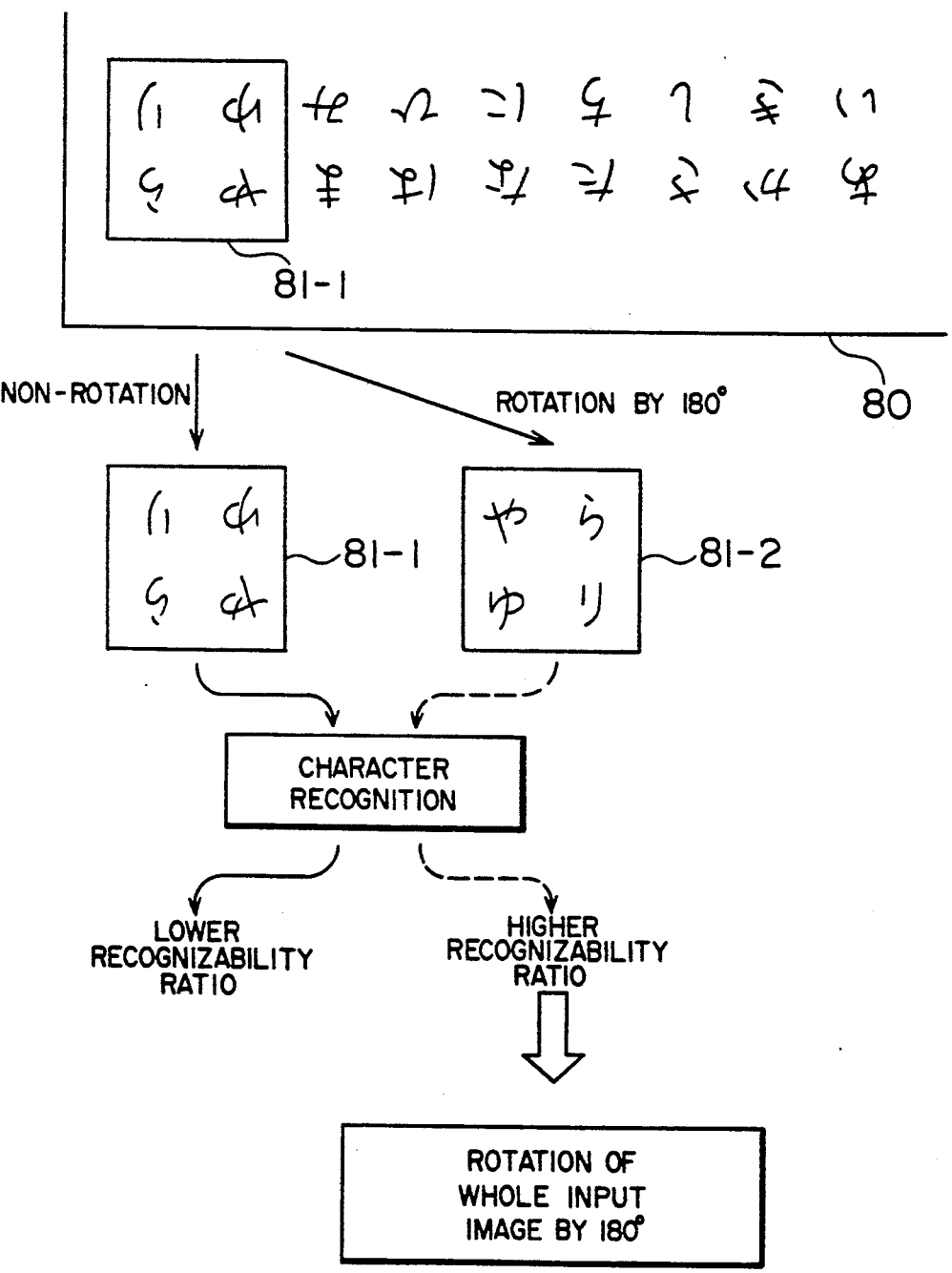
FIG. 15 is a diagram for illustrating correction of orientation of an input image portion.

Next, referring to FIG. 2, description will be made of a flow of processings executed according to the teachings of the present invention incarnated in the instant embodiment on the assumption that an image or picture is divided into two image portions which are inputted separately and sequentially and joined together into one image on the memory, as is illustrated in FIG. 3. Now, referring to FIG. 2, a first image portion is inputted through the scanner 3 at a step 100, which is then followed by a step 102 where a joining reference point for the image joining is detected from the first inputted image portion. As the joining reference point, there may be utilized a characteristic point detected from a joining position indicator mark printed on a carrier sheet or a mark added interactively on the screen of the display 5 by using a mouse, a cursor or the like. At a step 104, there are performed correction of orientation of the first inputted image portion by determining the top and the bottom thereof as well as collection of inclination of the first input image portion by calculating the angle of inclination thereof on the basis of the joining reference point extracted at the step 102. However, as the method of performing correction of orientation or disposition of the input image, there can be conceived such a method as illustrated in FIG. 15 in addition to the abovementioned method which is based on the utilization of the joining reference points. More specifically, referring to FIG. 15, a partial image 81-1 is cut out from an image 80 of concern, whereon recognizability ratio of characters which can be recognized on the cut-out image portion in the non-rotated state is compared with the recognizability ratio of characters recognizable on a partial image 81-2 which corresponds to the cut-out image portion rotated by 180° When the recognizability ratio for the partial image rotated by 180° is found greater than that of the non-rotated partial image as the result of the abovementioned comparison, the input image is rotated by 180°.

Figure 17:
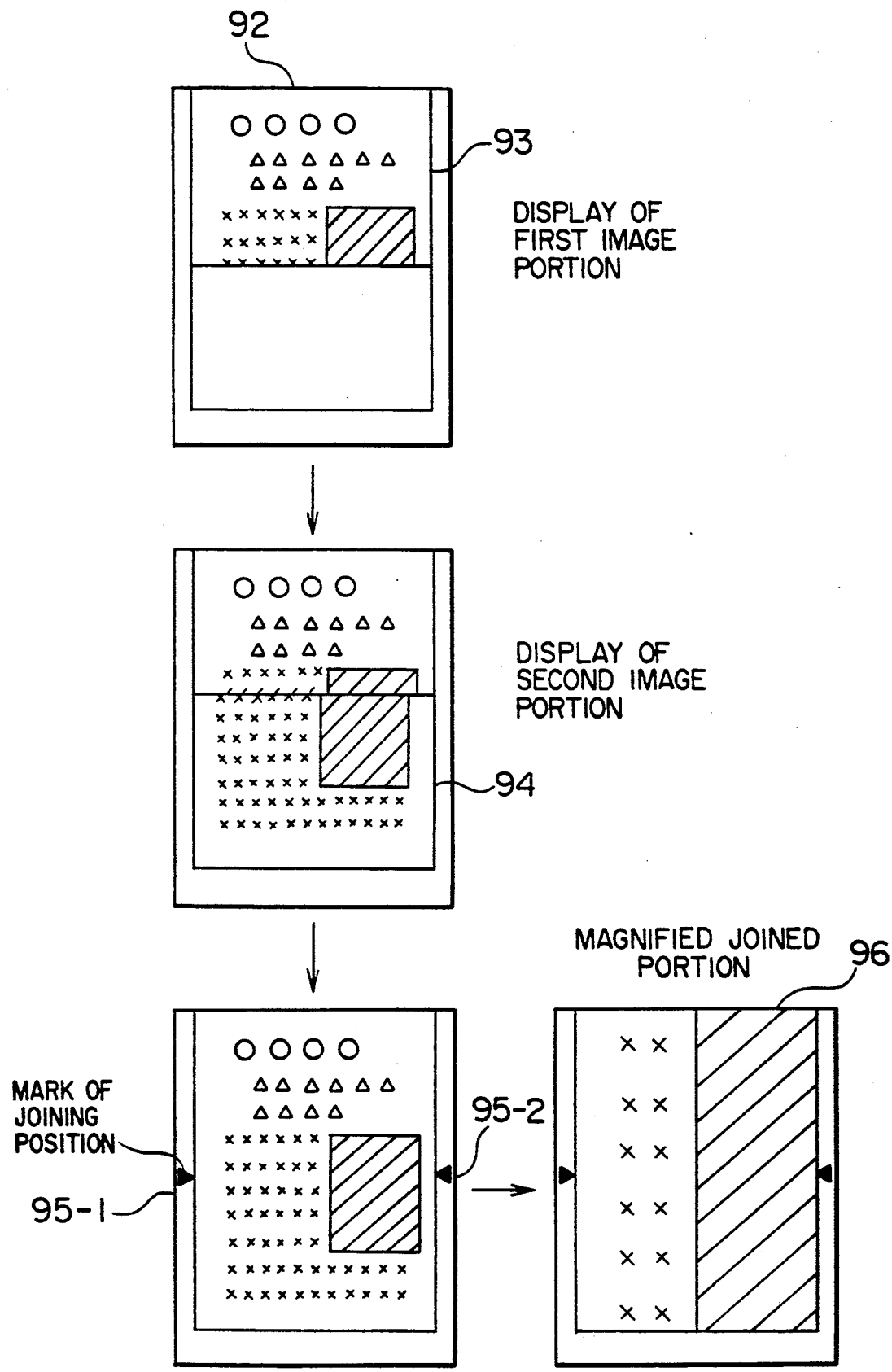
FIG. 17 is a view showing, by way of example, a method of indicating a joining position of two image portions joined together.

At a check step 106, the display 5 is made use of for confirming visually the input image portion undergone the correction of inclination. When it is decided as a result of this check step 106 that the image inputting has to be made again, then execution of the processing step 100 to 106 is repeated at a step 108. If otherwise, a second image portion is inputted through with the aid of the scanner 3 at a step 110, whereon the processings similar to those executed at the steps 110 to 118 is performed to thereby obtain the second image portion corrected in respect to the inclination. At a step 120, both the first and second image portions are standardized (i e. both image portions are aligned in size). At a step 122, an optimal joining position is detected from an overlap region between the two image portions. At a step 124, a joining processing is performed such that joint along the boundary between the two image portions become unnoticeable. At a step 126, the two image portions in the memory 11 is joined together to one image. At a step 128, the image resulting from the joining step 126 is displayed for the purpose of visual check (confirmation of the result of the image joining). In that case, efficiency of the visual check can be enhanced by making use of joining position marks 95-1, 95-2, etc. indicating the boundary line between the first input image portion 93 and the second input image portion 94 on the display screen 92, as is illustrated in FIG. 17. Further, when high accuracy is required for the joining processing, a function for magnifying or enlarging the joint portion upon displaying, as shown at 96 in FIG. 17, may be incorporated to thereby facilitate the visual check. Parenthetically, the memory 11 has memory areas 11a and 11b for storing the image portions as divided and a memory area 11 for storing the image resulting from the processing for joining together the divided image portions. The joining processing may be performed in the memory area 11a or 11b. After the joining processing, the joined image may be stored in the memory area 11c after deletion of the marks which become no more necessary.

Figure 4:
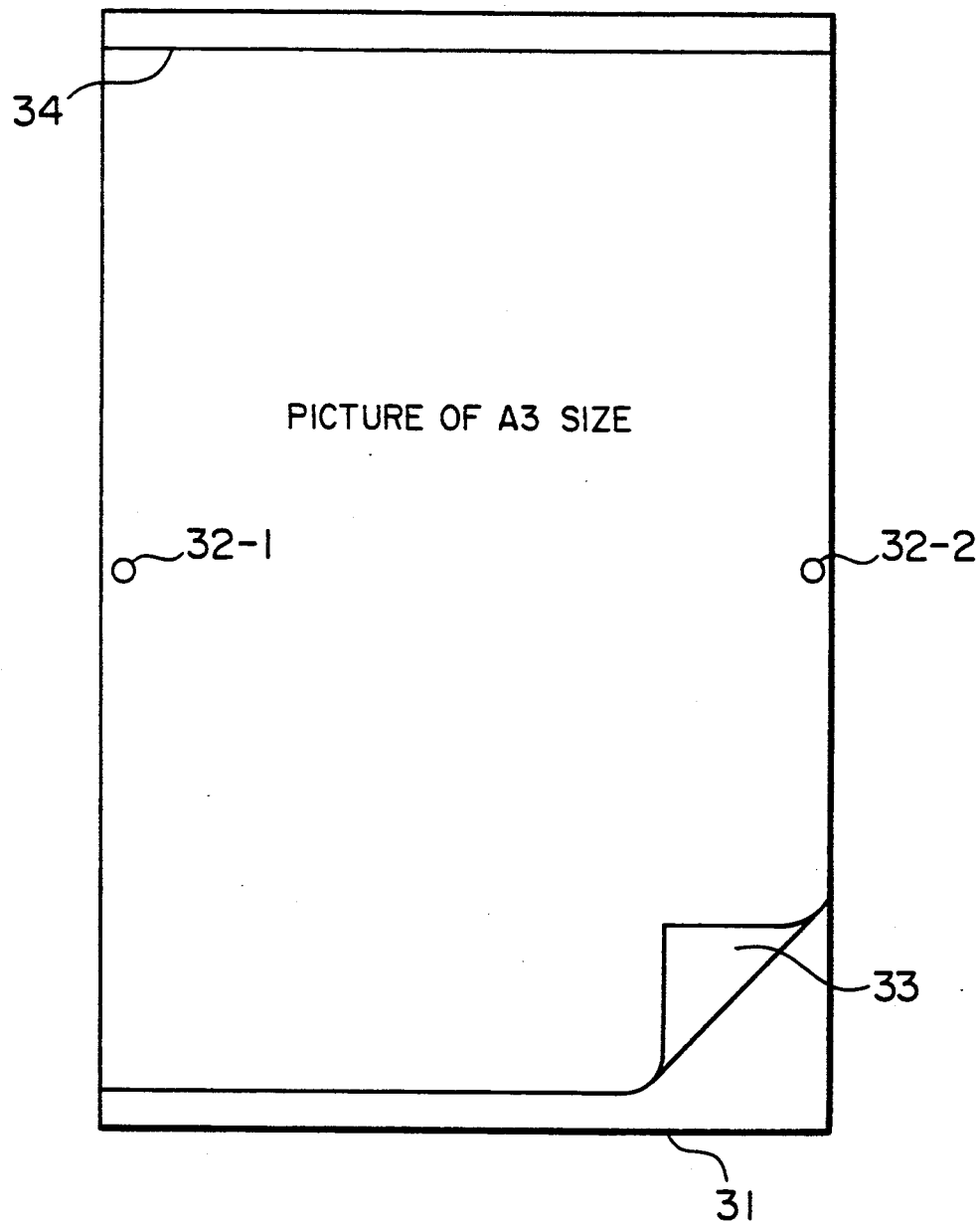
FIG. 4 is a view showing, by way of example, specifications of a carrier sheet which can be employed for imputting an image top be processed in accordance with an embodiment of the invention.

Upon image inputting operation by using the scanner, there may be utilized a transparent sheet case or a carrier sheet such as shown in FIG. 4. The specification of the carrier sheet shown in FIG. 4 is so designed as to allow a picture or image of A3 size to be inputted by using a scanner of A4 size. In FIG. 4, a reference numeral 31 denotes a layout sheet and 33 denotes a transparent sheet. An image or picture to be scanned is inserted between the layout sheet 31 and the transparent sheet 33 with reference to an insert position standard 34 printed on the layout sheet 31 and fixed in position through cooperation of the layout sheet 31 and the transparent sheet 33. In FIG. 4, reference numerals 32-1 and 32-2 denote joining position indicator marks which are printed on the transparent sheet 33 at mid positions of the left and right sides thereof, respectively.

Turning to FIG. 3, the image carrier or picture 20 whose image is to be inputted is placed within the carrier sheet, wherein marks 20-1 and 20-2 lying on the picture 20 to be inputted represent the joining position indicator marks, respectively. Reference numeral 21 denotes a first image portion and 22 denotes a second image portion. Further, reference numeral 21-1 denotes a region of the first image portion 21 over which the first image portion is to overlap the second image portion 22, while numeral 22-1 denotes a region of the second image portion 22 over which the latter overlaps the first image portion 21. It is to be noted that the regions 21-1 and 22-1 are of a same size. Further, numerals 21-2 and 22-2 denote those regions of the first and second image portions 21 and 22 over which both image portions 21 and 22 form no overlap with each other. A reference numeral 23 denotes a joined image resulting from the joining together of the first and second image portions 21 and 22. Further, a numeral 23-2 denotes a region of the joined image 23 over which the first and second image portions 22-1 and 22-2 are overlapped with each other. The region 23-2 is of the same size as the regions 21-1 and 22-1, respectively.

It will now be understood from the above description how the image input operation can be carried out by making use of the carrier sheet having the joining position indicator marks printed thereon. At this juncture, it should be mentioned that the joining position indicator marks are only required to lie within the regions of the first and second image portions over which these portions are to be overlapped with each other. For example, the joining position indicator marks may each be prepared in the form of an adhesive seal which is affixed to the overlapping region of the image to be inputted.

Next, referring to FIG. 16, description will be made of a method for indicating the joining reference points on the display screen through interactive procedure by using a mouse after the image input operation.

Figure 16:
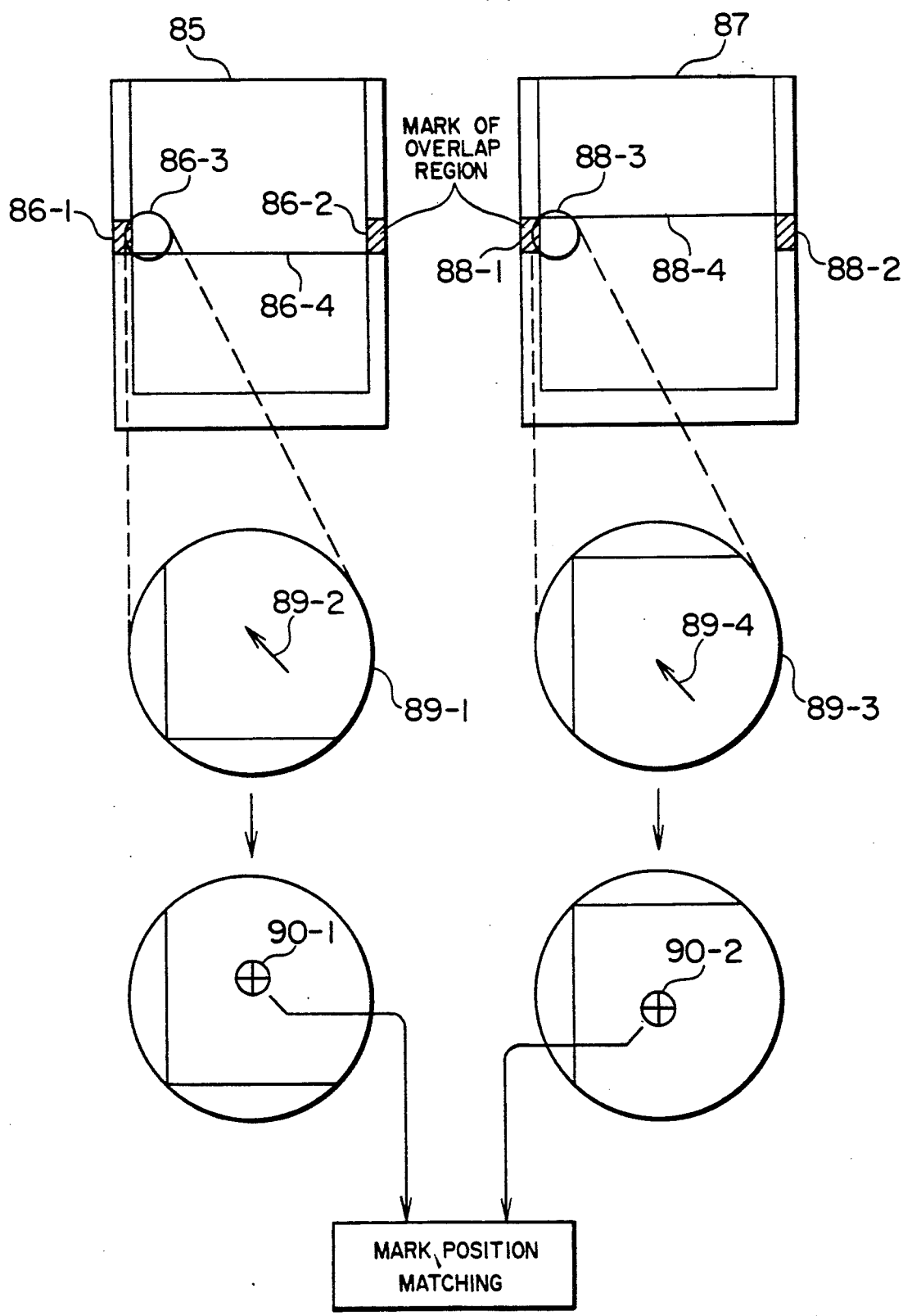
FIG. 16 is a view for illustrating a method of indicating joining reference points by using a mouse, by way of example.

In FIG. 16, a reference numeral 85 denotes an image displayed upon inputting of the first image portion which is designated by 86-4 in this figure. Further, reference numerals 86-1 and 86-2 denote marks for indicating an overlap region. A portion 86-3 of the overlap region is shown as magnified at 89-1. The user viewing the display moves a mouse cursor 89-2 to a position within the overlap region which is to be designated as the joining reference point. After having moved the mouse cursor to the position to be designated as the reference point for the joining, a mark affixage operation is performed to thereby attach the joining position indicator mark 90-1 to the first input image portion which is being displayed. Although it is assumed in the case of the illustrated embodiment that the mark attaching operation is effected by depressing a corresponding mouse button, it can readily be understood that this procedure can equally be realized by inputting a corresponding command from the keyboard.

For the second input image portion, operation similar to the abovementioned is performed to affix a joining position indicator mark 90-2. The joining position indicator marks affixed through the procedure described above can be made use of as the reference marks for the joining of the first and second image portions.

Next, description will be directed to a mark detecting operation which is destined for detection of the mark position and extraction of a characteristic point characterizing the mark of which the position has been detected. For detecting the mark position, rectangles enclosing interconnected black pixels (e.g. a small circle of black pixels) is extracted from a region of the image at which the mark is to be detected. Thereafter, of the rectangles as extracted, the position of the rectangle having a size corresponding to the mark is detected.

As a method of extracting the characteristic point of the mark of which position has been detected, there may be mentioned a centroid (center point) detection method based on a structural analysis and a pattern matching method, which will be described below.

CENTROID DETECTION BY STRUCTURAL ANALYSIS

Figure 5A:
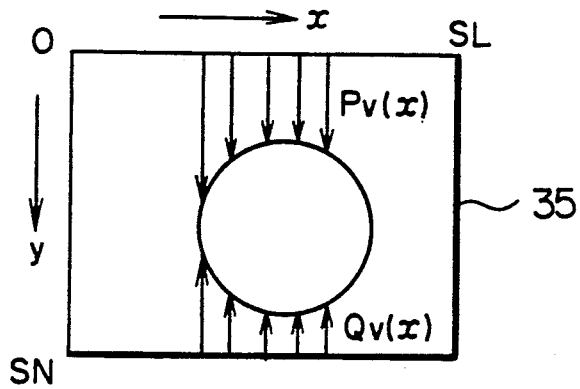
FIGS. 5A, 5B and 5C are views for illustrating the principle underlying a mark center detecting method based on a structural analysis.

The principle underlying the centroid detection method based on the structural analysis will be described by reference to FIGS. 5A, 5B and 5C.

(1) Within the rectangle 35 cut out, distances $Ph(y)$ and $Qh(y)$ to the leftmost and rightmost contour segments of the mark as well as distances $Pv(x)$ and $Qv(x)$ to the topmost and lowermost outline segments of the mark are determined, respectively, whereon a table listing these distances for discrete values of x and y, respectively, is prepared. In FIG. 5A, only the distances $Pv(x)$ and $Qv(x)$ in the y-direction are shown.

Figure 5B:
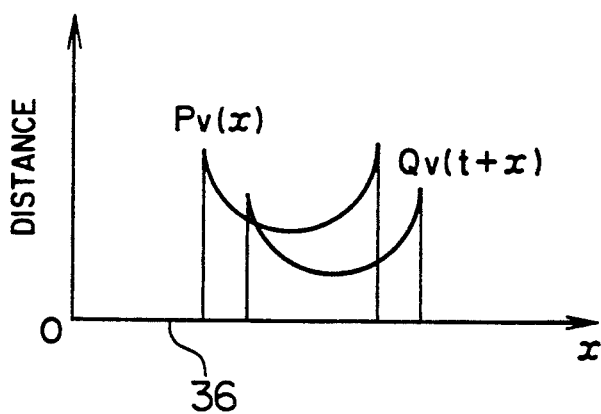
Figure 5C:
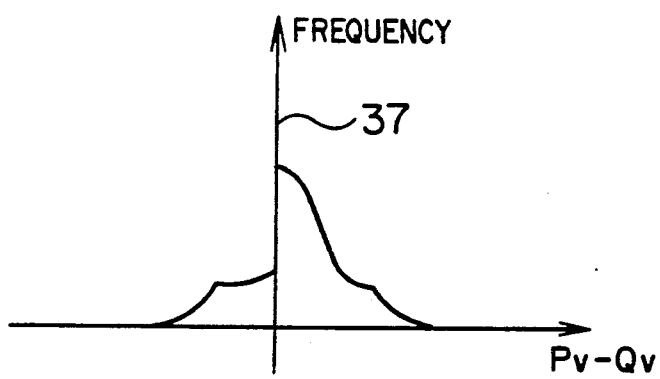

(2) Next, the distance curve $Pv(x)$ is inverted and then the distance curve $Qv(x)$ is shifted in parallel by t, as shown at 36 in FIG. 5B, whereon difference given by $Pv(x) - Qv(x\ t)$ is determined. Thereafter, a frequency distribution 37 is determined. With the term "frequency", it is intended to mean the number of cases (or number of samples) where the difference $Pv(x) - Qv(x\ t)$ assumes a certain value. Thus, when the difference mentioned above assumes a constant value for most of the discrete values x, the frequency distribution is given by a distribution curve having a peak at the constant value mentioned above.

(3) The abovementioned processing (2) is repeated for a range of $-sx \leq t \leq sx$ (range delimited by the rectangle cut out) to thereby create a frequency distribution map.

(4) The abovementioned processings (2) and (3) are also executed for the differences $Ph(y) - Qh(y+t)$ to thereby create a corresponding frequency map.

(5) Finally, a point at which the frequency defined above becomes maximum is determined and defined as the center position or centroid of the mark of concern.

Figure 6:
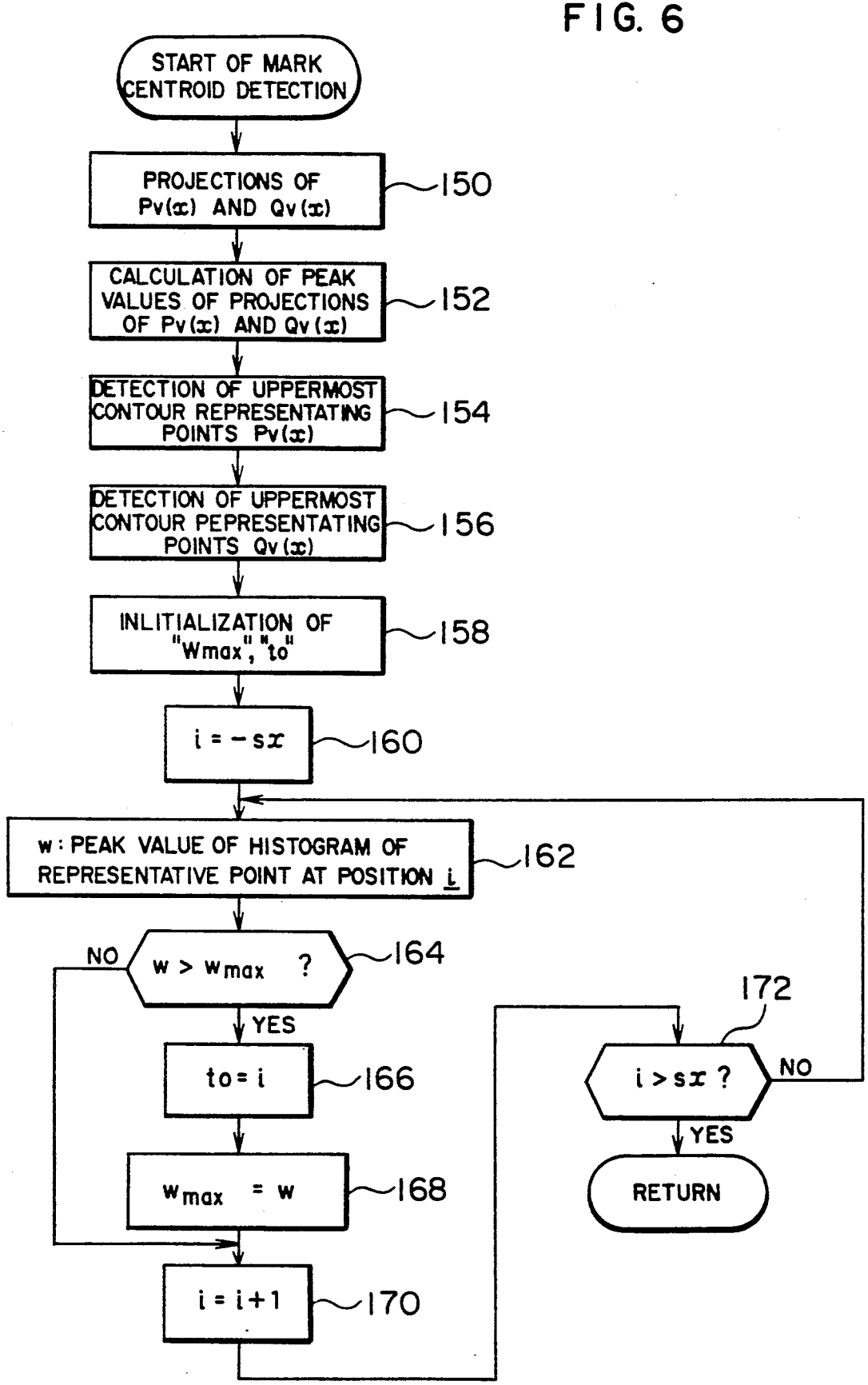
FIG. 6 is a flow chart for illustrating procedure of detecting the mark center or centroid by the structural analysis method.

FIG. 6 is a flow chart for illustrating the centroid detection processing based on the structural analysis.

Referring to the figure, at a step 150, projections of Pv(x) and Qv(x) in the vertical direction (y-direction) are determined. At a step 152, on the basis of the projections in the vertical direction, the x-coordinate at which the black pixels are at maximum is arithmetically determined. The coordinate x is set up as a provisional centroid of the mark of concern, whereon the values of the limits sx are determined with reference to the coordinate x determined arithmetically. At a step 154, the distances Pv(x) to the upper contour line segment (or points representing the upper contour line segment) are detected. Similarly, at a step 156, the distances Qv(x) to the lower contour line segment (points representing the lower contour line segment) are detected. At a step 158, the maximum value $w_{max}$ of the peak value w of a histogram representing th frequency distribution and magnitude of the shift t in the x-direction at which the peak value makes appearance in the histogram are set as initial values. At a step 160, a positional parameter i is initialized to the limit value of -sx. At a step 162, the histogram peak value representing the frequency distribution at the position i is set to be w. At a step 164, it is decided whether or not the value w is greater than the value $w_{max}$. When the decision step 164 results in "NO" (i.e. w is smaller than $w_{max}$), processings at the steps 170 et seq. are performed. Otherwise, processings at the steps 166 and 168 are executed. At a step 166, magnitude of the shift i in the x-direction at which the peak value makes appearance in the histogram is set to be $t_O$. At a step 168, the maximum value $w_{max}$ of the histogram is replaced by the peak value x of the histogram at the position i. At a step 170, the value of i is incremented by one. At a step 172, decision is made as to whether or not the value of i is greater than that of sx. Unless the value of i is greater than that of sx, the processing steps 162 to 170 are executed again. Otherwise, the centroid detection routine comes to an end. Through the similar procedure, magnitude of the shift $s_O$ at which maximum frequency in the histogram makes appearance in the y-direction can be determined. In this manner, the centroid positions $c_x$ and $c_y$ of the mark can be arithmetically determined on the basis of the shift magnitudes thd O and sO in the x- and y-directions at which the maximum values make appearance in the respective histograms in accordance with $$(c_x, c_y) = (t_O/2, s_O/2).$$

Figure 7A:
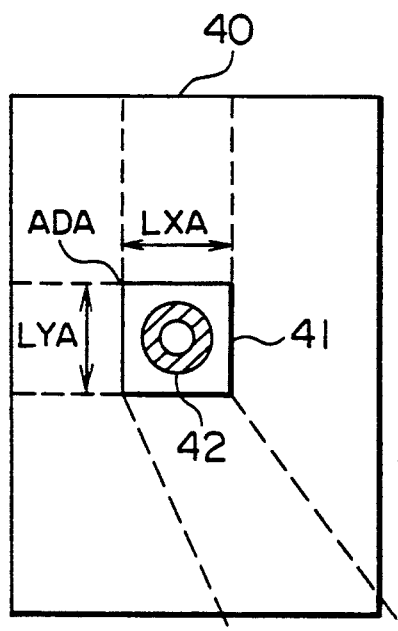
FIGS. 7A, 7B and 7C are views for illustrating the principle underlying a pattern matching method.
Figure 7B:
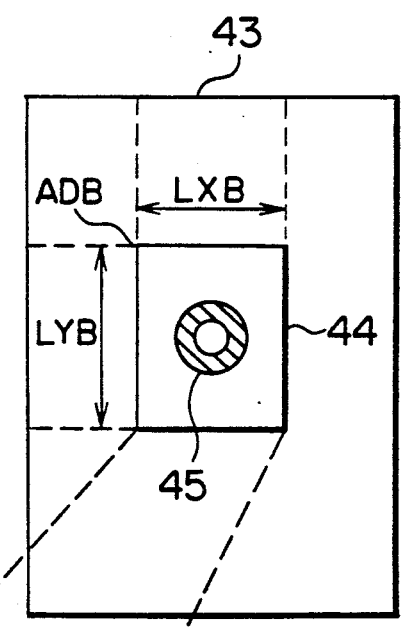

By utilizing the arithmetically determined centroid coordinates, processings such as correction of inclination, image overlapping and others are performed. Pattern matching method FIG. 7 is a view for illustrating the principle underlying the image overlapping method which is based on the pattern matching. In the FIGS. a reference numeral 40 denotes a reference image, and 41 denotes a matching pattern which is cut out from the reference image 40. For cutting out the matching pattern 41 from the reference image 40, the result of the mark position detection is utilized. A numeral 42 denotes a joining position indicator mark which is assumed to be included in the matching pattern 41 in the case of the illustrated embodiment. A numeral 43 denotes an object image to be matched, 44 denotes a rectangle to be matched, and 45 denotes a pattern to be matched which is assumed to be included in the rectangle 44. With the pattern matching now under consideration, it is aimed to detect from the rectangle 44 a pattern having the highest similarity to the matching pattern 41 and identify the coordinates of the joining position indicating mark for the detected pattern as the matching coordinate position.

Figure 7C:
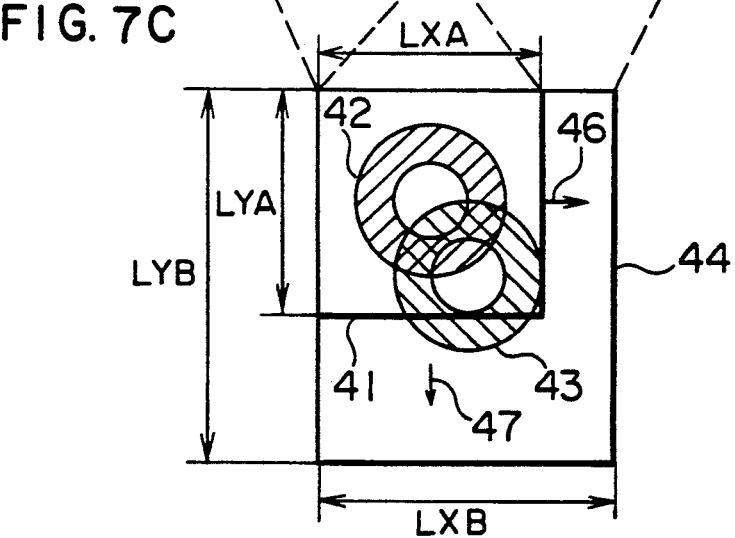
Figure 8:
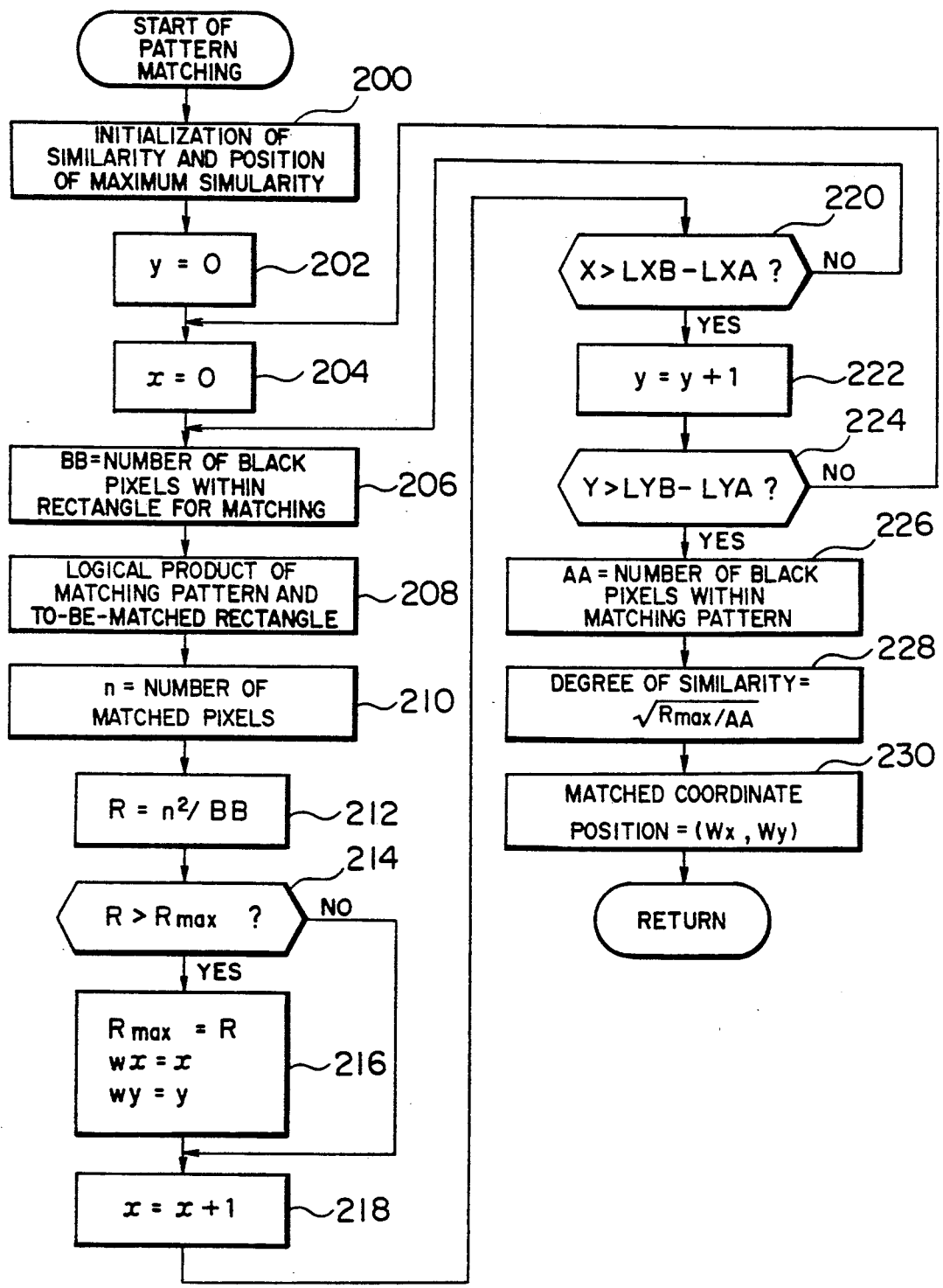
FIG. 8 is a flow chart for illustrating the processings involved in executing the pattern matching.

FIG. 8 shows a processing flow of the pattern matching. At a step 200, the maximum value $R_{MAX}$ of a parameter indicating a degree of similarity and the matching coordinates ($w_x$, $w_y$) are set. At a step 202, the start position for the matching processing in the y-direction is set as an initial value. At a step 204, the processing start position in the x-direction is set as an initial value. At a step 206, the number of black pixels (number of dots) BB existing in a region is arithmetically determined which region is defined within the rectangle 44 to be matched (rectangle to undergo the matching processing) and which has a same size as the matching pattern 41 having an upper left corner ADA (FIG. 7A) at the coordinates (x, y) and a vertical side LYA and a horizontal side LXA, as is shown in FIG. 7C. Next, a logical product of the matching pattern and the rectangle to undergo the matching processing is determined at a step 208. Subsequently, at a step 210, the number x of the black pixels for which matching or coincidence is found in the logical product resulting from the step 208 is arithmetically determined. At a next step 212, the parameter R which represents the degree of similarity between the matching pattern and the to-be-matched rectangle and which is given by $R = n^2/BB$ is arithmetically determined. At a step 214, decision is made as to whether or not the parameter R representing the degree of similarity is greater than the maximum value $R_{MAX}$ thereof. When this decision step 214 is affirmative (Y), the processing proceeds to a step 216. If otherwise (N), a processing step 218 is executed. At the step 216, the maximum value $R_{MAX}$ of the parameter representing the degree of similarity is set to the value R, wherein the corresponding x-coordinate is represented by $w_x$ with the y-coordinate by $w_y$. At the step 218, the value of x is incremented by one. This means that the matching pattern 41 is shifted relative to the to-be-matched rectangle 44 in the direction indicated by an arrow 46 by one dot (or by LXA/M when the side LXA has a length equivalent to the number M of dots). Every time the value of x is incremented, the value of the similarity parameter R is arithmetically determined in the manner described above. At a step 220, decision is made as to whether or not the processing for one line of the to-be-matched rectangle 44 has been completed (i.e. whether or not the matching pattern 41 has been shifted just to the right side of the to-be-matched rectangle 44). When the processing has not yet been completed, execution of the processing steps 206 to 218 is repeated. On the other hand, when the processing has been completed, the value of y is incremented by one at a step 222, which means that the matching pattern 41 is shifted relative to the to-be-matched rectangle 44 in the downward direction 47 by one bit (or by LYA/N when the side LYA has a length equivalent to the number N of dots). Every time the matching pattern 41 is shifted in the downward direction 47 by one dot, the value of the parameter R is arithmetically determined. At a step 224, it is checked whether or not the matching processing for the whole rectangle 44 has been completed. Unless the matching processing is completed, execution of the processing steps 204 to 222 is repeated. When it is completed, processing steps 226 et seq. are executed. Namely, at the step 226, the number of the black pixels within the matching pattern 41 is arithmetically determined. This number is represented by AA. At the step 228, the degree of similarity is calculated by using the value AA and the maximum value $R_{MAX}$ of the parameter indicating the degree of similarity in accordance with $$\text{Degree of similarity} = \sqrt{R_{MAX}/AA} .$$

At a step 230, the coordinates ($w_x$, $w_y$) at which the degree of similarity assumes a maximum value are set as the matching coordinate position, whereupon the pattern matching processing comes to an end.

In the case of the embodiment described hereinbefore in conjunction with FIG. 5, a circle is shown as the joining position indicator mark utilized in the centroid detecting method. However, the invention is never restricted to the circle, but ellipse or rectangle can equally be employed. Further, in conjunction with the joining position indicator mark utilized in the centroid detecting method based on the structural analysis, it is only required that the outermost contour line of the mark is of a central point symmetry. Accordingly, there may be used, for example, a circle in which a design such as an emblem is written. On the other hand, the joining position indicator mark which is used in the pattern matching method may be of any geometrical shape or pattern on the condition that the mark can be identified discriminatively from the ambient background, no graphic pattern similar to that of the mark is present in the overlap portion and that the mark can be discriminated from the periphery thereof.

As a method of detecting an optimal joining position from the image overlap region, there can be conceived a least pixel change line detection method, a greatest white line detection method, a white tracing method, a random joining method and others. In the following, the least pixel change line detection method, a logical OR (sum) joining method, the white tracing method and the geometrical transformation method will be described as the optimal joining position detecting methods. Least pixel change line detection method The least pixel change line detection method will be explained by reference to FIG. 9. In the figure, a reference numeral 50-2 denotes an overlap region where two images or picture overlap each other. For convenience of description, it is assumed that six lines exist in the overlap region 50-2. In the case of the illustrated example, the number of times white/black change occurs in each of the six lines is assumed to be six for the first line, six for the second line, twelve for the third line and tens for the fourth to sixth lines, respectively, as can be seen in FIG. 9. Thus, the lines for which the number of the white/black changes is minimum are the first and the second lines ①  and ②. Further, differences in the number of the white/black changes between the adjacent lines are "0", "6", "2", "0" and "0" respectively. Thus, the lines for which the number of white/black changes and the abovementioned difference are minimum are the first and second lines. Accordingly, the joining position is detected as lying between the first and second lines.

Figure 10A:
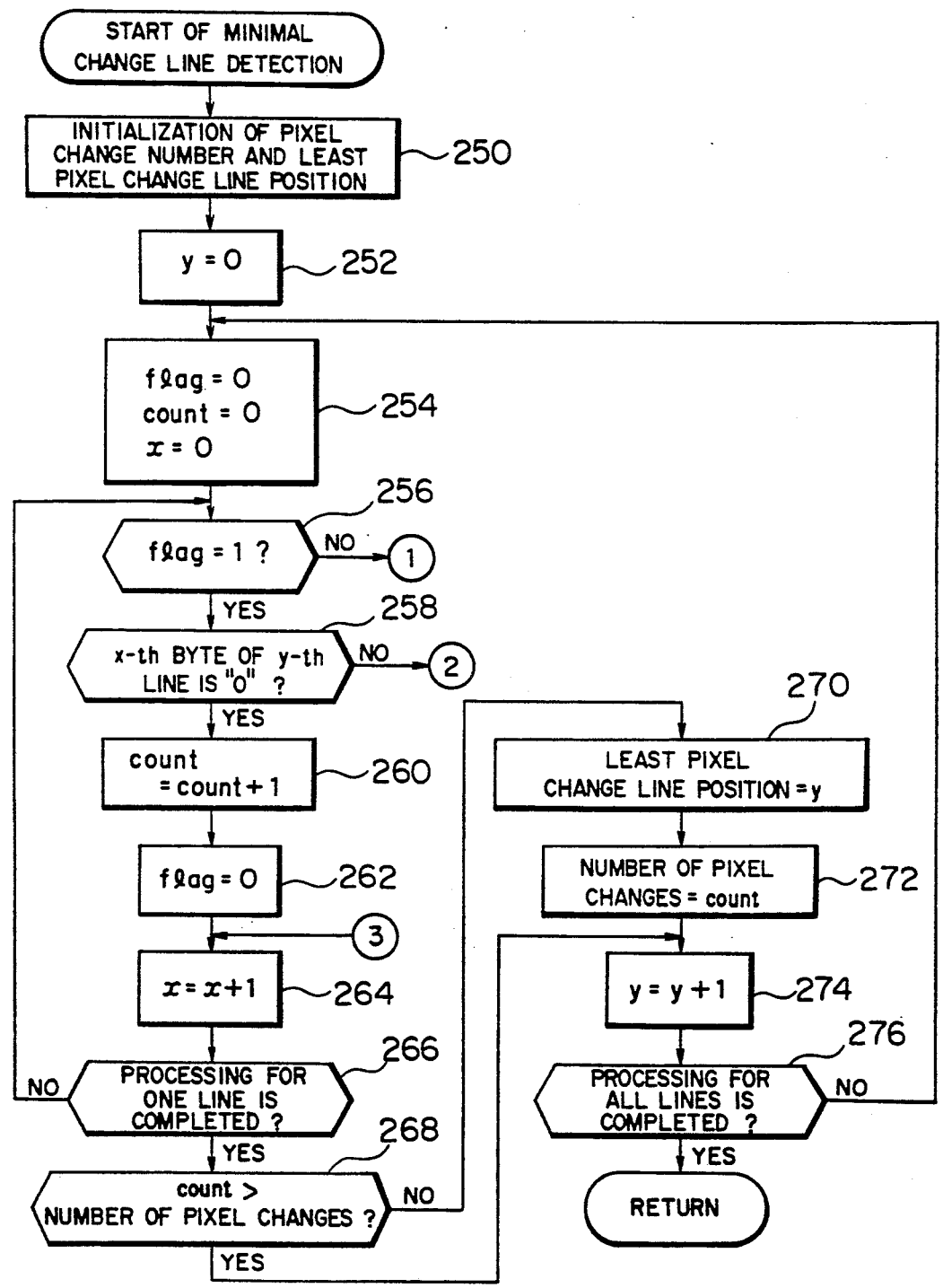
FIGS. 10A, 10B and 10C are flow charts for illustrating processing steps involved in carrying out the least pixel change line detection method.
Figure 10B:
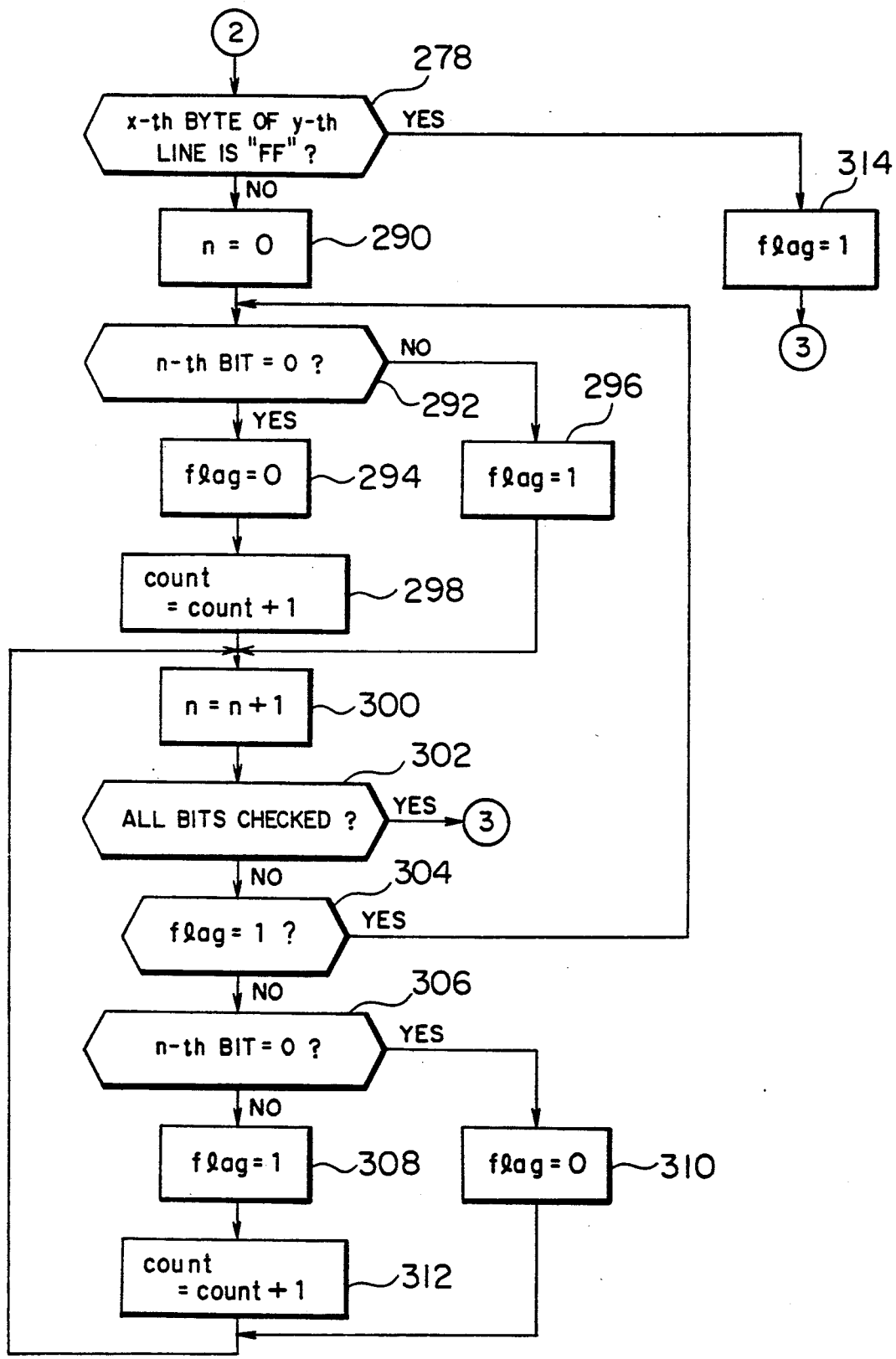
Figure 10C:
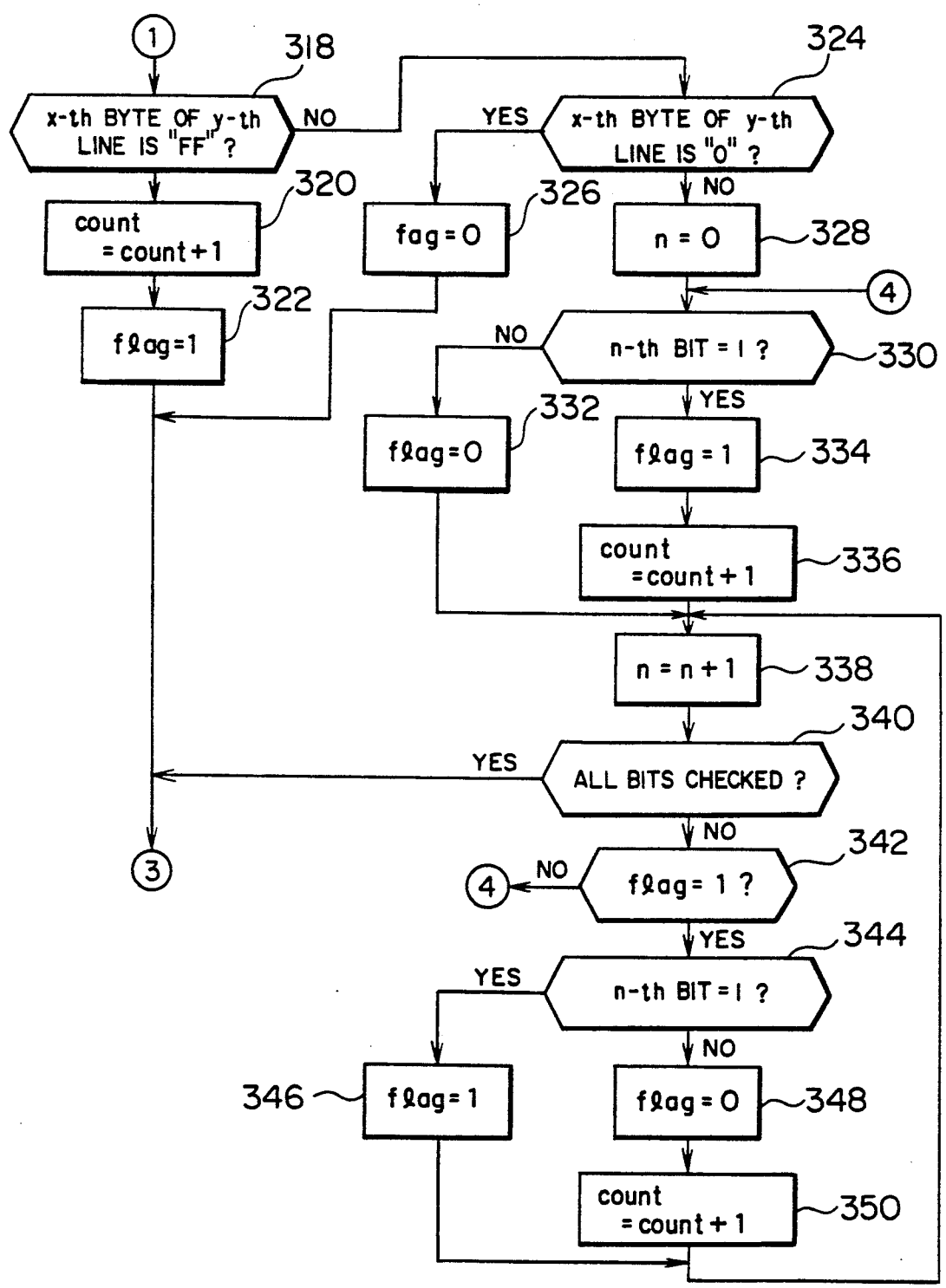

FIGS. 10A, 10B and 10C are flow charts for illustrating flows of processing steps involved in carrying out the least pixel change line detection method on the assumption that image data are fetched on a byte basis from the overlap region, whereon white or black dot decision is performed on a dot basis. By checking the white/black dot changes with the aid of a black pixel detection flag, the number of times the white/black change occurs is counted. At a step 250, the number of change points and the least pixel change line position are initialized. At a step 252, the line position for the detection processing is set to the start line position (y=0) of the overlap region. At a step 254, the black pixel detection flag is cleared, and the number of changes in the pixels is initialized to zero. Further, the byte for detection processing is initially set at the start position of the line (x=0). At a step 256, the black pixel detection flag is checked as to whether it contains "1" or "0". In case the flag is "1", indicating that the immediately preceding pixel is black, then processing steps 258 to 262 are executed. On the other hand, when the flag is "0", indicating that the immediately preceding pixel is white, processing steps 318 et seq. are executed. First, let's consider the case where the black pixel detection flag is "1".

At the step 258, it is checked whether or not the pixels of the x-th byte on the y-th line are all white. When the pixels of concern are all white, the processing proceeds to the steps 260 et seq.. Otherwise, the processing step 278 and the following are executed. At the step 260, the number or count of pixel changes is incremented by one. At a step 262, the black pixel detection flag is cleared to zero.

At the step 278, it is checked whether or not the pixels of the x-th byte on the y-th line are all black. In case these pixels are all black, the black pixel detection flag is set to "1" at a step 314. If otherwise, a processing step 290 and the following are executed for making the white/black decision on the pixel basis. More specifically, at step 290, a pixel pointer is initialized. At step 292, decision is made as to whether the pixel pointed by the pixel pointer is white or black. When the pixel is white, the black pixel detection flag is cleared to zero at the step 294, and the number of pixel changes is incremented by one at the step 298. On the other hand, in case the pixel is black, the black pixel detection flag is set to "1" at the step 296. At a step 300, the pixel pointer is incremented by one, and it is checked at a step 302 whether or not the processing for all the pixels of the x-th byte on the y-th line has been completed. If so, subsequent processing steps 264 et seq. are executed for the succeeding one byte. Unless the processing mentioned above is yet completed, it is then checked at a step 304 whether or not the black pixel detection flag is "1". If so, execution of the processing steps 292 to 302 is repeated. When the black pixel detection flag is "0", it is checked at a step 306 whether the pixel pointed by the pixel pointer is white or not. In case it is white the black pixel detection flag is cleared to "0" at a step 310. On the other hand, when the pixel of concern is black, the black pixel detection flag is set to "1" at a step 308, and the number or count of the pixel changes is incremented by one, whereon execution of the processings at the steps 300 et seq. is resumed.

When it is found at the step 256 that the black pixel detection flag is "0", the processings at steps 318 and the following are performed similarly to the processings executed when the black pixel detection flag is "1".

More specifically, at the step 318, it is checked whether or not the pixels of the x-th byte on the y-th line are all black. When all the pixels of concern are black, the number or count of pixel changes is incremented by one (step 320), and the black pixel detection flag is set to "1" (step 322). If otherwise, the processing steps 324 et seq. are executed.

The processing steps 324 to 350 correspond to the processing steps 278 to 314 by reading with the phrase "black pixel" being replaced by "white pixel".

At the step 264, the position of the byte to undergo the detection processing is advanced by one. At the next step 266, decision is made on the basis of the position of the byte for the detection processing whether or not the processing for one line has been completed. When the processing has been completed, the processing steps 268 et seq. are executed. If otherwise, execution of the processing steps 256 to 264 is repeated. At his time, it is checked at the step 268 whether or not the number of pixel changes occurring on the current line just processed is greater than that of the line processed precedingly. When the former is smaller than the latter, the processing steps 270 to 272 are executed. If otherwise, the processings at the steps 274 et seq. are executed. At the step 270, the position of the current line is set as the position of the line in which the number of pixel changes is minimum. At the step 272, the number of pixel changes occurring on the current line is set as the minimum number of pixel changes. At the step 274, the position of the line for the detection processing is advanced by one, and it is checked at the step 276 whether or not the processings for all the lines existing within the overlap region have been completed. If completed, the processing procedure comes to an end. Otherwise, the processing steps 254 to 274 are executed again.

Through the processing procedure described above, the least pixel change line method can be detected.

Greatest white line detection method

Figure 11:
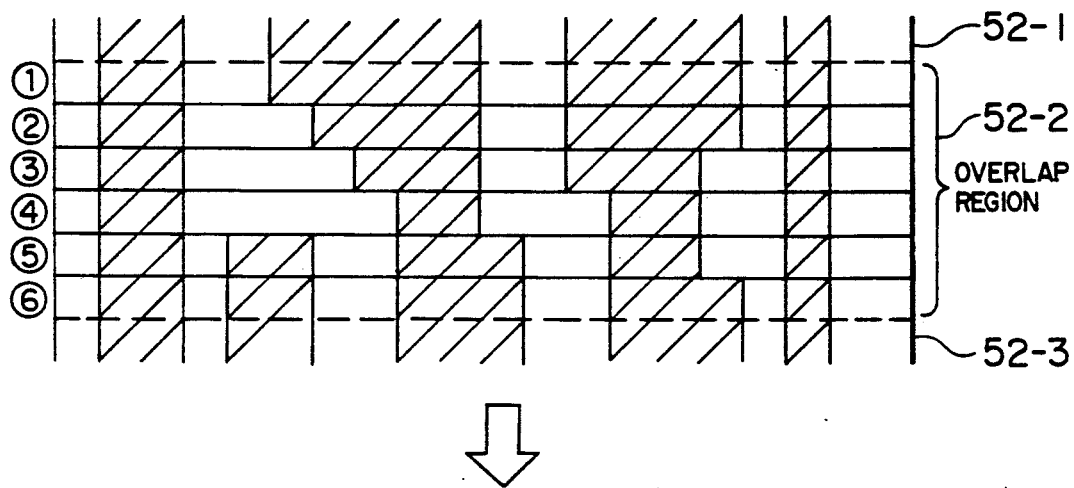
FIG. 11 is a view for illustrating a greatest white line detection method for joining together divided images.

By reference to FIG. 11, description will be made of a greatest white line detection method for detecting the line having a greatest white region as the position for the image joining. In the figure, reference numerals 52-1 and 52-3 denote regions where no overlap of two images takes places. A numeral 52-2 denotes a region over which the two images overlap each other. It is also assumed that the overlap region covers six lines. The numbers of white pixels on the first to sixth lines are eight, nine, eleven, thirteen, ten and nine, respectively. Obviously, the line containing the greatest number of white pixels is the fourth line. Further, differences in the number of white pixels between adjacent lines are one, one, two, three and one, respectively. Thus, the lines where the number of the white pixels is greatest and where the inter-line difference of the pixel number is minimum are the third and fourth lines ③ and ④, respectively. Accordingly, the position for joining together the images is detected as being located between the third line ③ and the fourth line ④.

White tracing method

Figure 12:
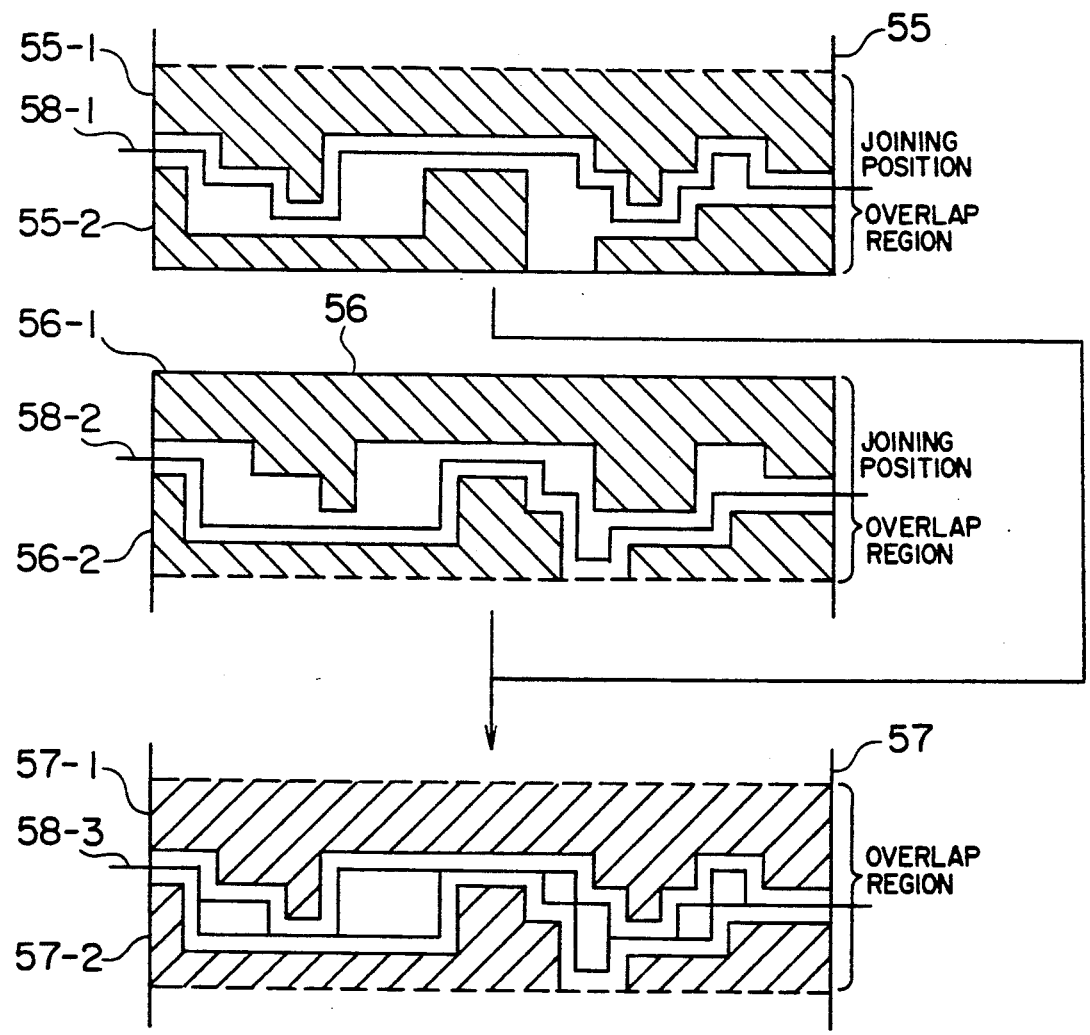
FIG. 12 is a view for illustrating a method for joining together divided images by resorting to a white tracing method.

By reference to FIG. 12, description will be made of a method for joining images by making use of the white tracing method. In the figure, a reference numeral 55 designates an overlap region of a first image, and 56 denotes an overlap region of a second image. At this juncture, it is assumed that both the first and second images have been subjected to some or less distortion or deformation upon inputting thereof. Further, a reference numeral 57 denotes an overlap region over which the first and second images are overlapped with each other. A numeral 58-1 denotes a joining position of the first image which is detected by tracing white regions extending transversely in the overlap region 55, and a reference numeral denotes a joining position of the second image which is detected by tracing white regions existing transversely in the overlap region 56. For joining together the two images, the first image 55 is cut at the joining position 58-1 to leave the image portion 55-1, while the second image 56 is cut at the joining position 58-2 to leave the image portion 56-2. When the image portions 55-1 and 56-2 are joined together along the joining line or position 58-2, there is obtained a joined image 57. In that case, gaps existing along the joining position 58-3 due to mismatch between the joining position 58-1 of the first image and the joining position 58-2 of the second image remain white. Through this method of tracing the white regions for joining together the two images at white or blank regions as far as possible, image distortions, deviations or the like which may be brought about upon inputting of the two images to be joined can be absorbed or compensated for.

Logical sum joining method

Figure 13:
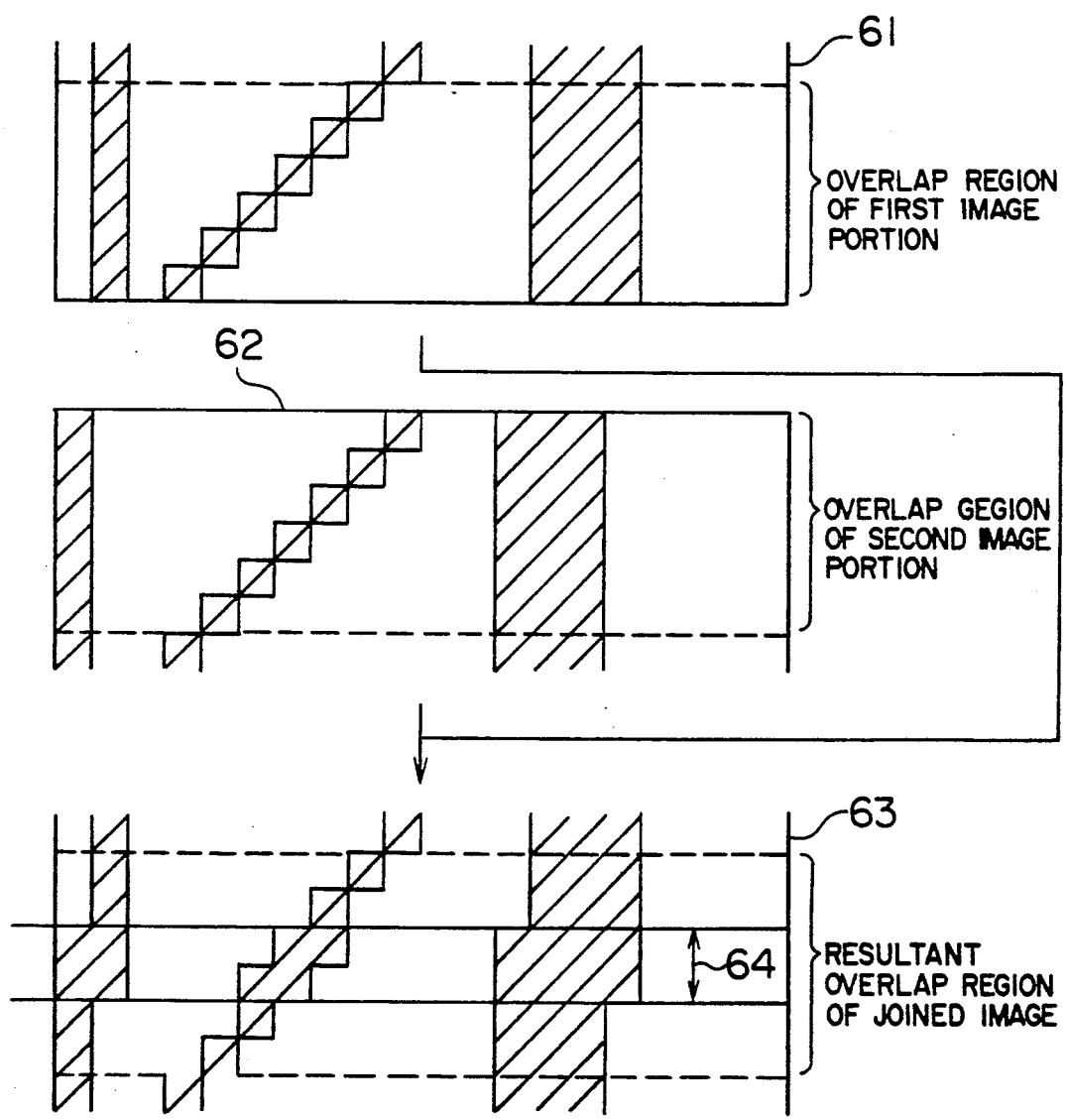
FIG. 13 is a view for illustrating an image joining method based on a logical sum (ORing) method.

By reference to FIG. 13, description will be made of the image joining method effected by resorting to a logical sum or ORing method. In FIG. 13, a reference numeral 61 denotes an overlap region of a first image to be joined, and 62 denotes an overlap region of a second image to be joined. In the case of the instant example, it is also assumed that both images have undergone distortions or deviations more or less upon inputting thereof. A reference numeral 63 denotes an overlap regions over which the two images are superposed with each other. A logical sum region resulting from ORing of the two images is designated by 64. In the case of this example, the resultant overlap region contains the regions 64 resulting from the logical ORing performed on a two-dot basis.

Geometrical transformation method

Figure 14:
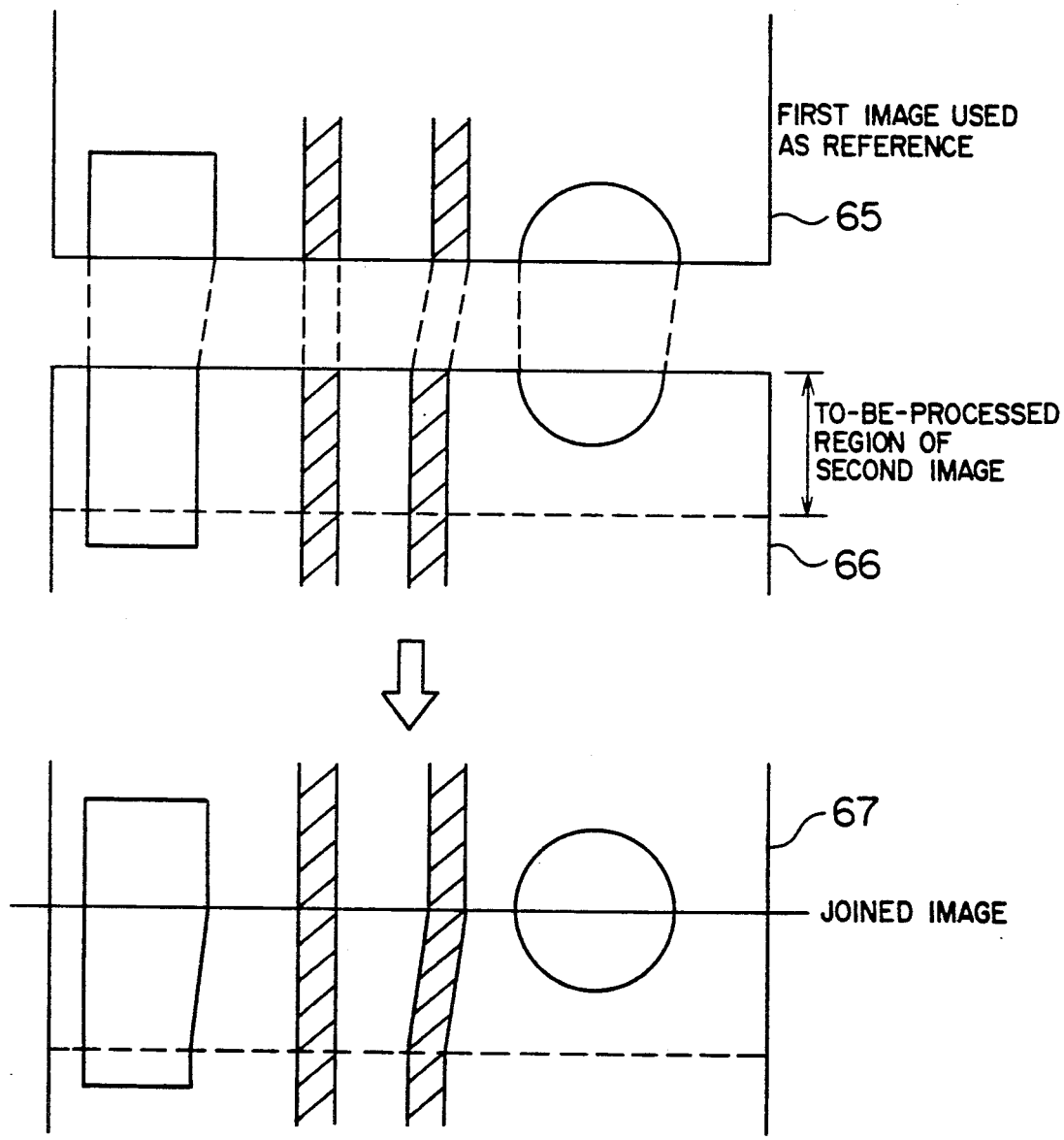
FIG. 14 is a view for illustrating a method for joining together two image portions through a geometrical transformation.

By reference to FIG. 14, description will be made of a method for joining together smoothly the two images by performing a geometrical transformation. In this figure, a reference numeral 65 denotes a first image to be joined and 66 denotes a second image to be joined. Further, a reference numeral 67 denotes a resultant image obtained by the image joining after geometrical transformation. With this joining method, it is aimed to obtain a resultant image joined smoothly by performing geometrical transformation such as extension or contraction on a region of the second image to be processed for the image joining by utilizing the first image as a reference image for the geometrical transformation.

In the first place, end points of each black pixel string are detected, whereon the end points of the black pixel strings on the reference image and the image portion within the to-be-processed region are set in one-to-one correspondences, respectively. After completion of the correspondence setting processing for all the black pixel strings existing along the boundary line, the whole region to be processed of the second image is subjected to the geometrical transformation on the basis of the correspondence information obtained, so that no boundary line become visible between the adjacent images to be joined together.

In the foregoing, there have been disclosed five types of the joining position detecting methods, i.e. the least pixel change line detection method, the greatest white region line detection method, the white tracing method, the logical sum joining method and the geometrical transformation method. Of these methods, the logical sum joining method and the white tracing method are realized by performing the corresponding image processings on the two images overlapped with each other, while the least pixel change line detection method and the geometrical transformation method are adapted to perform the respective image processings for the boundary line of the two images to be joined together.

The methods described above may further be applied for joining together input image portions of a greater size image by dividing it into four image portions, as will be described below.

Example of four-division input for image joining

Figure 18:
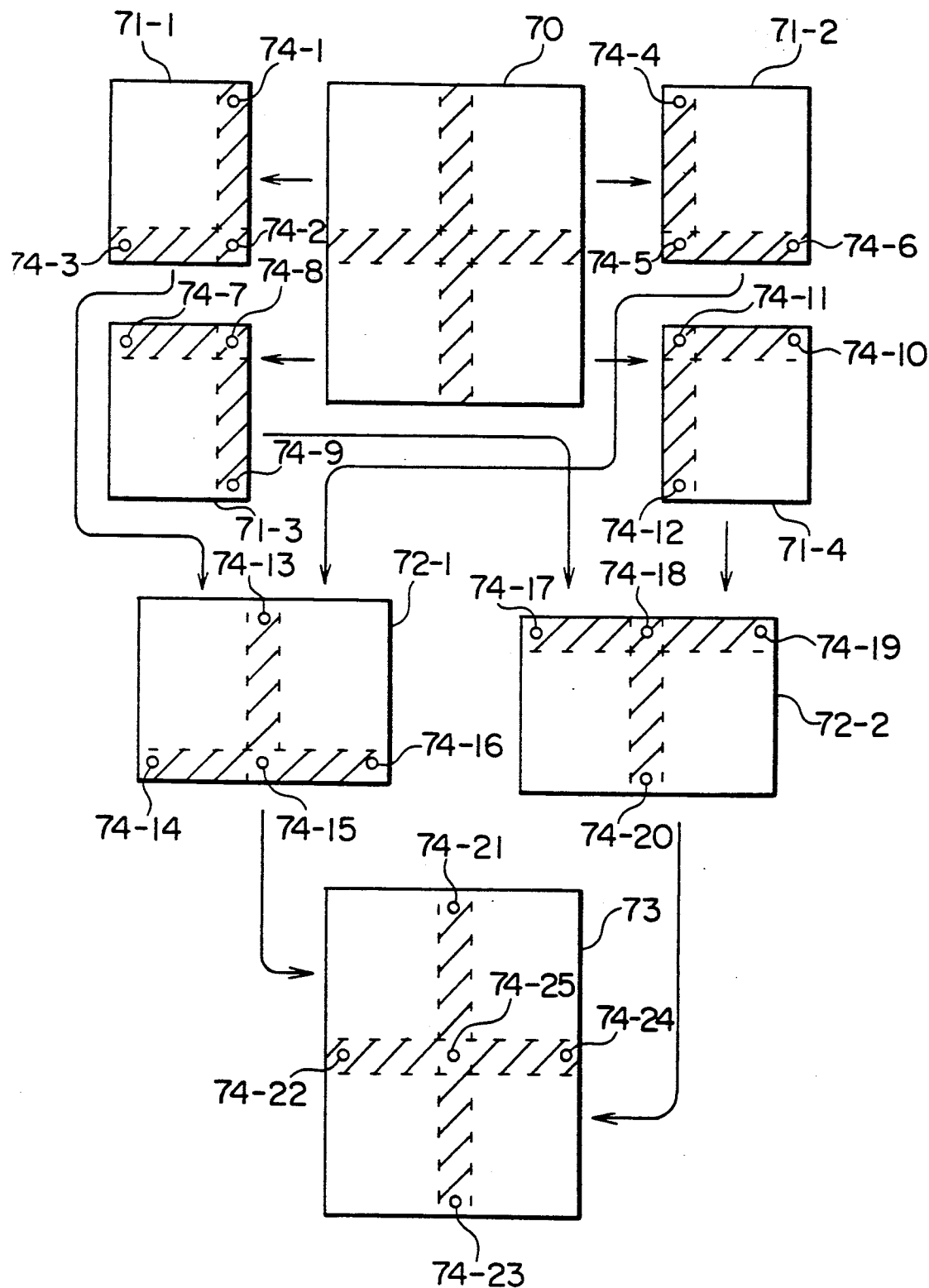
FIG. 18 is a view for illustrating, by way of example, a method of inputting an image of a greater size by dividing the image into four image portions according to another embodiment of the invention.

FIG. 18 shows an example of inputting an image of a greater size through scanning by dividing the image into four image portions. In the FIG. a reference numeral 70 denotes an image or picture to be inputted, numerals 71-1 to 71∝ denote image portions resulting from division of the image 70 by four, wherein 70-1 denotes the upper left image portion, 71-2 denotes the upper right image portion, 71-3 denotes the lower left image portion and 71-4 denotes the lower right image portion, all of which are of a same size. Regions indicated by hatching all the overlap regions over which the individual image portions are to be overlapped with one another. Further, reference numerals 74-1 to 74-25 denote the joining position indicator marks, respectively. For joining together the image portion, the image portions 71-1 and 71-2 are joined together by making use of the joining position indicator marks 74-1 and 74-4 as well as 74-2 and 74-5 to thereby obtain a first half image portion 71-2. Next, the image portions 71-3 and 71-4 are joined together by utilizing the joining position indicator marks 74-8 and 74-11 as well as 74-9 and 74-12 to obtain a second half image portion 72-2. Finally, the first and second half image portions 72-1 and 72-2 are joined together by utilizing the joining position indicator marks 74-14 and 74-17 as well as 74-16 and 74-19 to thereby obtain a finally resultant image 73.

In conjunction with the method described just above, it should be mentioned that when the specifications of the individual joining position indicator marks printed at five locations on the carrier sheet 5 are changed form one to another mark to thereby identify discriminatively the quarter image portions, respectively, the use can get rid of a burden of taking into account the order in which these quarter image portions are inputted.

According to the instant embodiment of the present invention, it is possible to divide an image or picture of a fixed greater size such as A3, A2 etc. into a plurality of image portions and input sequentially these image portions which are then joined together on an image processor so that overlaps are produced between the adjacent image portions by using an image input device having a capability of reading an image or picture of a size slightly greater than A4 size.

As will now be appreciated from the foregoing detailed description, according to the inventive image joining methods and systems, an image to be processed can be inputted by using an image input device having a capability of reading an image of a size smaller than that of the image to be processed by virtue of such arrangement that the latter is divided into a plurality of image portions which are then sequentially inputted. Thus, installation of the image input and storage apparatus requires relatively small space, while inexpensive image input device can be employed, to great advantageous effects.

Further, because the marks indicating the reference points for joining together image portions are imparted to the respective overlap regions upon division of an image to be inputted and utilized for joining together the image portions to one image, positional alignment or matching of the image portions can be performed with improved accuracy, whereby the original image before being inputted can be restored for storage without being accompanied with any appreciable distortions and deviations at the joint to another advantageous effect of the invention.

I claim:

1. An image joining system comprising:
   image input means;
   image storage means for storing images inputted through said image input means; and
   joining position matching means for matching joining positions of the input images to be joined together;
   wherein when an image to be inputted exceeds a reading surface area of said image input means, said image is inputted by dividing said image into a plurality of image portions which have mutually overlapping portions, reading said image portions sequentially, and affixing marks whose positions can be detected to said overlap portions as joining reference points, said joining position matching means identifies discriminatively said joining reference points and joins together said input image portions to one image by making use of said joining reference points.

2. An image joining system according to claim 1, wherein said marks are deleted after said input image portions are joined together to reform the original image.

3. An image joining system according to claim 2, wherein said image portions have respective overlap portions, said image before being inputted is inserted in a carrier having marks capable of being detected as representing joining reference points.

4. An image joining system according to claim 2, wherein when a plurality of image portions are inputted, said image divided such that said image portions have mutually overlapping portions, a region of interconnected white pixels which extends transversely of the image is extracted from the overlapping portions of two image portions, whereon the joining positions of the two image portions are detected from said extracted region.

5. An image joining system according to claim 2, wherein when joining positions are detected for a plurality of inputted image portions divided such that said image portions have mutually overlapping portions, a first line having a minimum number of pixel changes and a second line located adjacent to said first line and having a minimum difference in the number of white pixels relative to said first line are detected from the overlapping portion of two adjacent image portions, whereon the joining position is determined as lying between said first and second lines.

6. An image joining system according to claim 2, wherein when joining positions are detected for a plurality of inputted image portions divided such that said image portions have mutually overlapping portions, a first line including white pixels at a maximum ratio and a second line located adjacent to said first line and having a minimum difference in the number of white pixels relative to said first line are detected from the overlapping portion of two adjacent image portions, whereon the joining position is determined as lying between said first and second lines.

7. An image joining system according to claim 2, wherein when first and second adjacent image portions are joined, and points of black pixel strings existing in the first and second image portions along a joint thereof are set to one-to-one correspondence, whereon image geometrical transformation is performed for a region to be processed in said second image portion with reference to said end points existing in said first image portion such that said black pixel strings are interconnected continuously.

8. An image joining system according to claim 2, wherein a mark having an outermost contour symmetric to a center point is used as a reference point identifying graphic pattern for indicating the joining position, and wherein when a characteristic point is detected from said mark out from the input image, said outermost contour of the mark is extracted for detecting said center point.

9. An image joining system according to claim 8, wherein an emblem is placed within said mark having said center symmetrical contour.

10. An image joining system according to claim 2, wherein upon inputting an image of a fixed size by using an image input apparatus having a reading surface area, said image is divided into a plurality of image portions such that said image portions have overlapping regions; and said image portions are inputted sequentially.

11. An image joining method, the method comprising the steps of:
   dividing an image to be inputted having a size exceeding a reading surface area of image input means into a plurality of image portions to be inputted sequentially such that the image portions have respective overlap regions;
   adding a region position detectable mark to each of the overlap regions to be utilized as a reference point for joining together said image portions;
   inputting the image portions resulting from said division sequentially through said input means;
   storing said divided input image in image storage means;
   identifying discriminatively said reference point from each of said plurality of input image portions;
   joining together said plurality of input image portions into one image by making use of said reference points; and
   deleting said position detectable marks.

12. An image joining method according to claim 11, wherein upon inputting said image is divided into a plurality of image positions, said image is superposed on a transparent sheet having position detectable marks printed thereon as reference points for joining said image portion such that said marks are positioned on overlapped regions of the image portions to be joined, respectively.

* * * * *